(12) United States Patent
Morimoto et al.

(10) Patent No.: US 8,780,407 B2
(45) Date of Patent: Jul. 15, 2014

(54) CONTROL APPARATUS, IMAGE READING APPARATUS, IMAGE FORMING APPARATUS, AND RECORDING MEDIUM FOR EFFICIENT REREADING

(75) Inventors: Atsuhisa Morimoto, Osaka (JP); Shiro Narikawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 922 days.

(21) Appl. No.: 12/764,499

(22) Filed: Apr. 21, 2010

(65) Prior Publication Data
US 2010/0271646 A1 Oct. 28, 2010

(30) Foreign Application Priority Data

Apr. 23, 2009 (JP) ................................ 2009-105574
Mar. 9, 2010 (JP) ................................ 2010-052185

(51) Int. Cl.
*G06F 15/00* (2006.01)

(52) U.S. Cl.
USPC ........................................................ 358/1.9

(58) Field of Classification Search
None
See application file for complete search history.

(56) References Cited

U.S. PATENT DOCUMENTS

| 5,563,403 A | 10/1996 | Bessho et al. |
| 6,049,636 A * | 4/2000 | Yang .............................. 382/289 |
| 6,791,723 B1 * | 9/2004 | Vallmajo et al. .............. 358/488 |

FOREIGN PATENT DOCUMENTS

| JP | 7-192086 A | 7/1995 |
| JP | 10-276316 A | 10/1998 |
| JP | 2001-188307 A | 7/2001 |
| JP | 2001-298588 A | 10/2001 |
| JP | 2007-201752 A | 8/2007 |
| JP | 2010-109547 A | 5/2010 |

* cited by examiner

*Primary Examiner* — Jeremiah Bryar
(74) *Attorney, Agent, or Firm* — Birch, Stewart, Kolasch & Birch, LLP

(57) ABSTRACT

An image processing apparatus is connected to an image reading apparatus which reads a read area set on a scanner platen in accordance with a size of a document placed on the scanner platen so as to create image data in which an image of the document is shown. The image processing apparatus includes a document detection section and an instruction section. The document detection section creates, based on the image data supplied from the image reading apparatus, document area information indicative of an area where the document is placed on the scanner platen. In a case where the area indicated by the document area information is not completely encompassed by the read area, the instruction section sets a reread area which completely encompasses the area indicated by the document area information and causes the image reading apparatus to read the reread area. In a case where a document which is not completely encompassed by the read area is read, a user can carry out a rereading process more easily than a conventional art.

10 Claims, 14 Drawing Sheets

| PAPER SIZE | NUMBER OF PIXELS | |
|---|---|---|
| | VERTICAL DIRECTION | HORIZONTAL DIRECTION |
| A3 | 297×R1／25.4 | 420×R2／25.4 |
| A4 | 210×R1／25.4 | 297×R2／25.4 |
| | 297×R1／25.4 | 210×R2／25.4 |
| A5 | 148×R1／25.4 | 210×R2／25.4 |
| | 210×R1／25.4 | 148×R2／25.4 |
| B4 | 257×R1／25.4 | 364×R2／25.4 |
| B5 | 182×R1／25.4 | 257×R2／25.4 |
| | 257×R1／25.4 | 182×R2／25.4 |

R1：INPUT RESOLUTION IN MAIN SCANNING DIRECTION
R2：INPUT RESOLUTION IN SUB-SCANNING DIRECTION

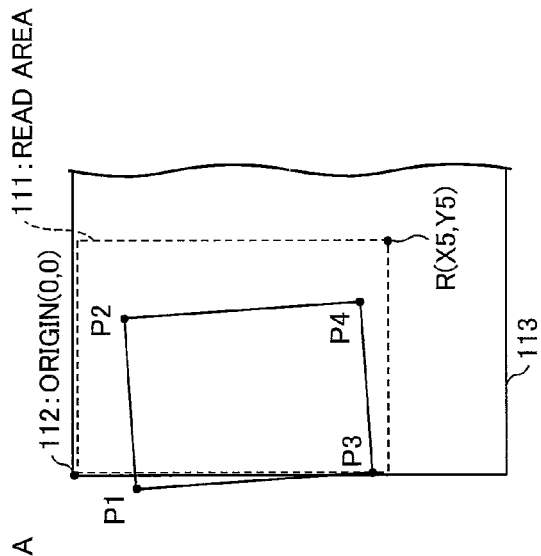
FIG. 7(a) STATE 1
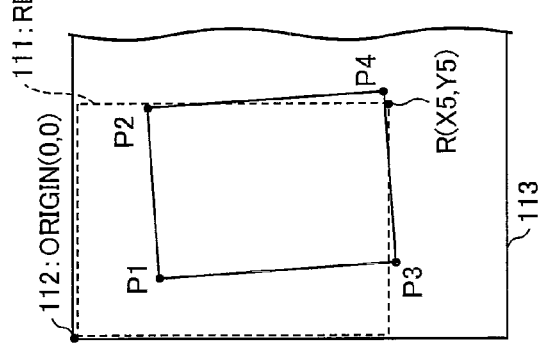
FIG. 7(b) STATE 2a
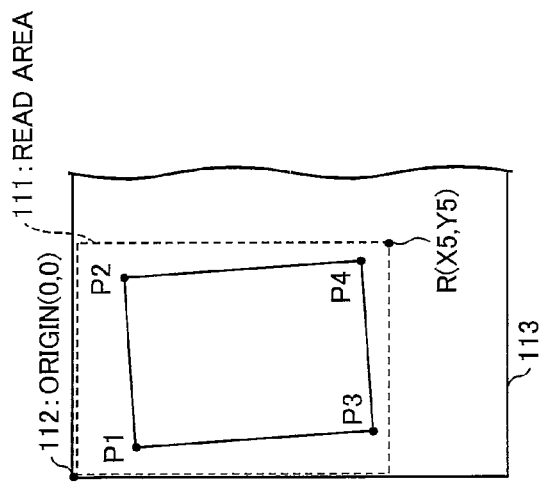
FIG. 7(c) STATE 2b

CONTROL APPARATUS, IMAGE READING APPARATUS, IMAGE FORMING APPARATUS, AND RECORDING MEDIUM FOR EFFICIENT REREADING This Nonprovisional application claims priority under 35 U.S.C. §119(a) on Patent Application No. 2009-105574 filed in Japan on Apr. 23, 2009 and Patent Application No. 2010-052185 filed in Japan on Mar. 9, 2010, the entire contents of which are hereby incorporated by reference.

TECHNICAL FIELD

The present invention relates to (i) an image reading apparatus which reads (scans) a document placed on a scanner platen so as to obtain an image of the document, and (ii) a control apparatus for controlling the image reading apparatus.

BACKGROUND ART

Conventionally, there has been known a technique in which (i) an image is obtained by reading a document by a scanner, (ii) a document image, which is a part of the image in which part the document is shown, is specified, and then (ii) only the document image is cropped from the image. Patent Literature 1 discloses an image input apparatus which crops a document image.

The image input apparatus disclosed in Patent Literature 1 carries out processing as follows. First, plural sets of size information, each of which indicates longitudinal and lateral lengths of a sheet having a predetermined shape, are stored according to size. Next, a size of a document part of inputted image data is obtained. Then, the size of the document part is compared with the plural sets of size information. In a case where there is size information which differs from the size of the document part within an allowable range, the image data is cropped based on size information which indicates a size closest to the size of the document part. Meanwhile, in a case where there is no size information which differs from the size of the document part within an allowable range, the image data is cropped based on the size of the document part.

CITATION LIST

Patent Literature 1

Japanese Patent Application Publication, Tokukai, No. 2007-201752 A (Publication Date: Aug. 9, 2007)

Patent Literature 2

Japanese Patent Application Publication, Tokukai, No. 2001-298588 A (Publication Date: Oct. 26, 2001)

SUMMARY OF INVENTION

Technical Problem

A conventionally known scanner has the following function. Specifically, such a scanner detects a document size before reading a document placed on a scanner platen, automatically sets a read area in accordance with the document size, and then reads the read area so as to create an image of the document. Such a scanner causes the following problems in a case where an edge (a side) of a document placed on a scanner platen is skewed with respect to a main scanning direction.

In a case where an A4 size document is placed on a scanner platen as illustrated in FIG. 1, a scanner carries out the following processes before a reading process. Specifically, the scanner (i) detects a document size, (ii) sets a read area which has substantially the same size as the A4 size document, i.e., has a size necessary and sufficient for the A4 size document to be read, and then (iii) reads the read area. The read area is defined by lines parallel to a main scanning direction and lines parallel to a sub-scanning direction. Therefore, in a case where an edge of the A4 size document placed on the scanner platen is skewed, by some angle, with respect to the main scanning direction, the A4 size document is not completely encompassed by the read area, as illustrated in FIG. 1. In a case where the A4 size document is not completely encompassed by the read area, a document image shown in an image scanned from the A4 size document has missing parts, as illustrated in FIG. 1. As such, in order to obtain a document image having no missing parts, a user has to go to trouble of manually correcting location of the A4 size document placed on the scanner platen before causing a scanner to read the document again.

The present invention was attained in view of the above problems, and an object of the present invention is to provide (i) an image reading apparatus which allows a user to carry out a rereading process more easily than before in a case where an image is read from a document while the document is not completely encompassed by a read area, and (ii) a control apparatus for controlling the image reading apparatus.

Solution to Problem

In order to attain the above object, a control apparatus of the present invention for controlling an image reading apparatus which creates image data of a document image by reading a read area that is set on a scanner platen in accordance with a size of a document placed on the scanner platen, includes: a determining section which determines, based on the image data, whether or not the read area completely encompasses a necessary area which needs to be read on the scanner platen; a setting section which sets, based on the image data, a reread area which completely encompasses the necessary area, in a case where the determining section determines that the read area does not completely encompass the necessary area; and a rereading instruction section which causes the image reading apparatus to read the reread area that is set by the setting section. Note that the necessary area may be an area where the document is place on the scanner platen or may be effective image area shown in the document.

According to the arrangement of the present invention, in a case where image data is read from the read area while a necessary area is not completely encompassed by the read area, a reread area, which encompasses an entire area of the necessary area, is set based on the image data, and then the reread area is read so that image data which contains necessary information (necessary area) having no missing part is created. Therefore, in a case where the read area is read while the necessary area is not completely encompassed by the read area, the document is automatically reread. This makes it possible to create image data showing a document image having no missing part without the need for a user to manually correct location of the document. As such, the arrangement of the present invention allows a user to carry out a rereading process more easily than a conventional art which requires a user to manually correct location of a document.

It is also possible that a document is read without detecting a document size, as described in Patent Literature 1. Specifically, the maximum area which can be read by a scanner may be set as an area to be read by the scanner. However, in this case, the maximum area is read by the scanner even in a case where the document is not skewed and is properly placed so that a corner of the document agrees with a reference position (e.g., upper left corner of the scanner platen). This causes an unnecessary area, in which the document or an effective image area of the document is not shown, to be read together with a necessary area. This requires a process of cutting the necessary part from image data. As a result, an amount of processing is increased. On the other hand, according to the present invention, a process of setting and reading a reread area is carried out in a case where the necessary area is not completely encompassed by the read area, but in a case where the necessary area is completely encompassed by a read area (an area set in accordance with a document size), the process of setting and rereading the reread area is not carried out and a process of cutting a necessary part from image data is not required. This allows for effective processing.

It is also possible that (i) four corners of a document placed on a scanner platen are found so that a bounding box is obtained, and (ii) the bounding box is set as a read area, as described in Patent Literature 2. However, This always requires a reading process to be carried out twice, i.e., (i) a first reading process in which an area where the document is placed (e.g. the maximum area which can be read by a scanner) is read so that the four corners can be found, and (ii) a second reading process in which an area where the bounding box is located is read, which area is detected based on the four corners thus found. As a result, it takes a lot of time to complete the processing. Further, since an entire area of the document is read in the first reading process, location of the document can be detected by data obtained in the first reading process. This means that the second reading process is meaningless. On the other hand, according to the present invention, a process of setting and rereading a reread area is carried out only in a case where a document whose necessary area is not completely encompassed by the read area is read. This allows for effective processing.

Advantageous Effects of Invention

According to the arrangement of the present invention, in a case where a document whose necessary area is not completely encompassed by the read area is read, a reread area which entirely encompasses the necessary area is set, and the document is automatically reread so that image data in which a document image having no missing part is shown can be created without the need for a user to manually correct location of the document. As such, the arrangement of the present invention allows a user to carry out a rereading process more easily than a conventional art which requires a user to manually correct location of a document.

BRIEF DESCRIPTION OF DRAWINGS

FIG. 7(a) is a view illustrating a state where an entire area of a document is encompassed in a read area.

FIG. 7(b) is a view illustrating a state where a document is not completely encompassed by the read area, but is completely encompassed by the scanner platen.

FIG. 7(c) is a view illustrating a state where a document is not completely encompassed by the read area and the scanner platen.

DESCRIPTION OF EMBODIMENTS

Embodiment 1

Figure 2:
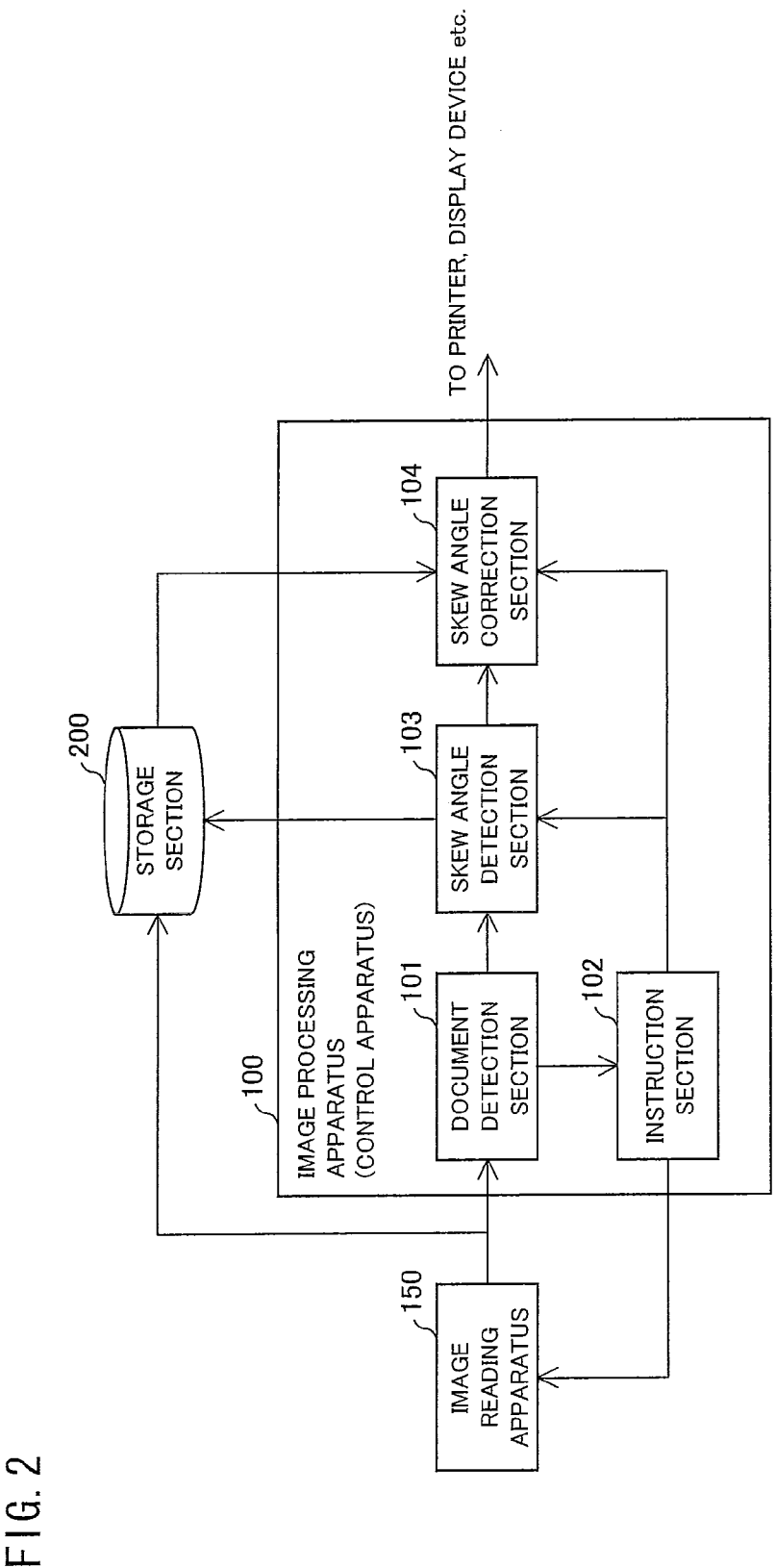
FIG. 2 is a block diagram schematically illustrating an arrangement of an image processing apparatus of an embodiment of the present invention.

Embodiment 1 is described below in detail. FIG. 2 is a block diagram schematically illustrating an arrangement of an image processing apparatus 100 of the present embodiment.

The image processing apparatus 100 of the present embodiment is connected to an image reading apparatus 150 and a storage section 200. The image processing apparatus 100 serves not only as an apparatus for processing image data created by the image reading apparatus 150, but also serves as a control apparatus for controlling the image reading apparatus 150.

The image reading apparatus 150 is a scanner which causes a CCD (Charge Coupled Device) line sensor to read a document placed on a scanner platen so as to create image data of an image (digital image) in which a document image is shown. Note that, in the present embodiment, a part of an image created by the image reading apparatus 150 in which part a document is shown is hereinafter referred to as "document image" (see FIG. 1).

The image reading apparatus 150 causes a sensor (not shown) to detect a document size of a document placed on a scanner platen before reading the document. Subsequently, the image processing apparatus 100 sets a read area 111, which is appropriate for the document placed on the scanner platen 113, based on the document size detected by the sensor (see FIG. 3). Then, the image reading apparatus 150 reads the read area 111 under the control of the image processing apparatus 100 so as to create image data of an image in which a document image is shown.

Figure 3:
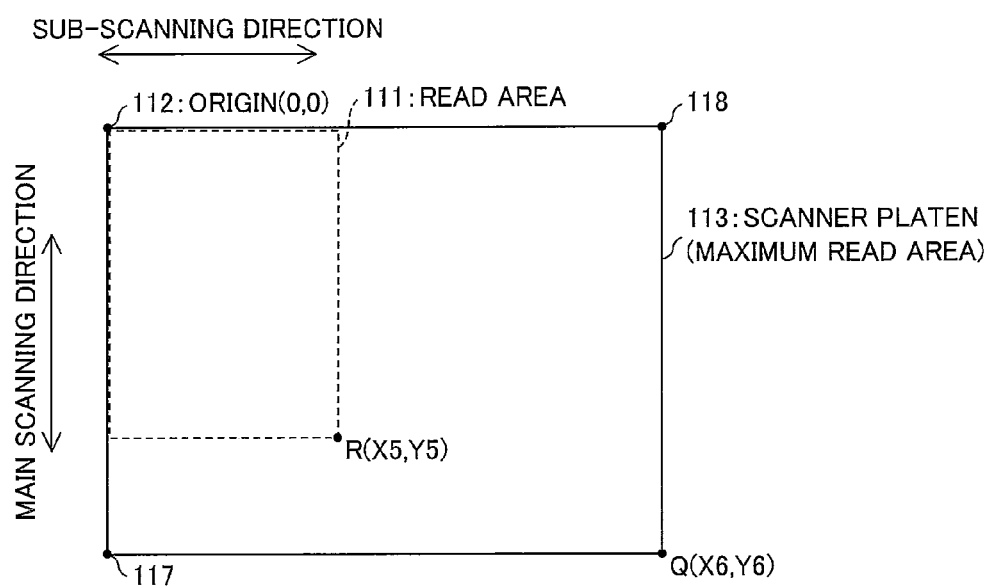
FIG. 3 is a view schematically illustrating (i) a scanner platen of an image reading apparatus of the embodiment of the present invention and (ii) a read area.

In the present embodiment, location of the read area 111 is determined so that an upper left vertex of the read area 111 coincides with an upper left vertex of the scanner platen 113, as illustrated in FIG. 3. Note that, in the present embodiment, (i) the upper left vertex of the scanner platen 113, i.e., the upper left vertex of the read area 111 is an origin 112, (ii) the main scanning direction is a Y-axis, and (iii) the sub-scanning direction is an X-axis. Further, an area on the scanner platen 113 is a first quadrant. Specifically, a direction pointing from the origin 112 towards a lower left vertex 117 of the scanner platen 113 is a Y-axis direction. Here, a Y coordinate values becomes larger in the direction pointing from the origin 112 towards the vertex 117. Further, a direction pointing from the origin 112 towards an upper right vertex 118 of the scanner platen 113 is an X-axis direction. Here, an X coordinate values becomes larger in the direction pointing from the origin 112 towards the vertex 118.

The read area 111 is defined by lines parallel to the main scanning direction and lines parallel to the sub-scanning direction, as illustrated in FIG. 3. Further, in a case where a document is placed lengthwise (in a case where a document is placed so that a longer side of the document is parallel to the main scanning direction), a length of the read area 111 in the main scanning direction is set to be a length (i) which is substantially the same as a length of the document in a longer side direction, and (ii) which is necessary and sufficient for an entire area of the document to be read, as illustrated in FIG. 3. In this case, a length of the read area 111 in the sub-scanning direction is set to be a length (i) which is substantially the same as a length of the document in a shorter side direction, and (ii) which is necessary and sufficient for the entire area of the document to be read.

This allows the entire area of the document to be completely encompassed by the read area 111 in a case where (i) a vertex of the document coincides with the origin 112 shown in FIG. 3, and (ii) the document is placed on the scanner platen 113 so that a longer side of the document is parallel to the main scanning direction. In a case where the read area 111 is read while the entire document is being completely encompassed by the read area 111, it is possible to obtain an image in which a document image having no missing part is shown (i.e. an image in which the entire area of the document is shown).

Figure 1:
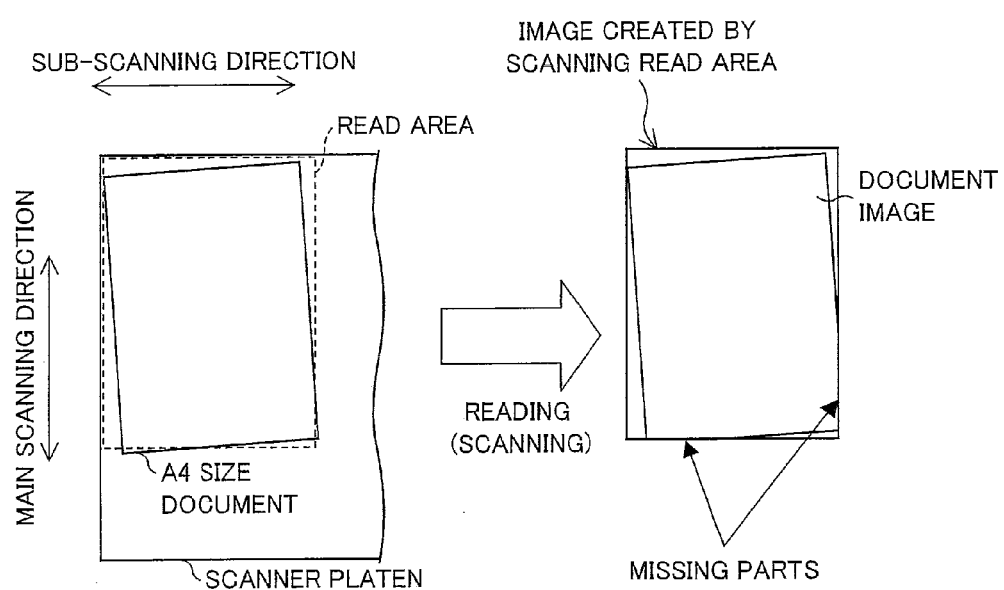
FIG. 1 is a view schematically illustrating a document placed on a scanner platen so as to be skewed and an image in image data read from the document.

Meanwhile, in a case where a document is placed on the scanner platen so that a longer side of the document is skewed with respect to the main scanning direction, the document placed on the scanner platen is not completely encompassed by the read area, as illustrated in FIG. 1. In a case where the read area is read while the document is not completely encompassed by the read area, an image in which a document image having missing parts is shown is created, as illustrated in FIG. 1.

In the present embodiment, a size of the read area 111 is set in accordance with a size of a document placed on the scanner platen 113. Note, however, that the maximum size of the read area 111 is the same as the size of the scanner platen 113 (see FIG. 3). That is, according to the image processing apparatus 100 of the present embodiment, an entire area of the scanner platen 113 can be set as the maximum read area.

The storage section 200 serves as data storage means for storing various kinds of data used in the image processing apparatus 100. A general hard disc device can be used as the storage section 200.

The image processing apparatus 100 includes a document detection section 101, an instruction section 102, a skew angle detection section 103, and a skew angle correction section 104, as illustrated in FIG. 2. Note that image data read from a document by the image reading apparatus 150 is supplied to the document detection section 101 and is stored in the storage section 200.

The document detection section (detection section) 101 is a block which detects (estimates), based on the image data supplied from the image reading apparatus 150, document area information indicative of an area where a document is placed on the scanner platen 113. Further, the document detection section 101 transmits, to the skew angle detection section 103, the image data supplied from the image reading apparatus 150.

The instruction section 102 is a block which determines, based on the document area information detected by the document detection section 101, how the document is placed, and then gives a rereading instruction or a skew angle correction instruction in accordance with a result thus determined. Note that the rereading instruction is given to the image reading apparatus 150, and the skew angle correction instruction is given to the skew angle detection section 103 and the skew angle correction section 104.

The skew angle detection section 103 is a block which, in response to the skew angle correction instruction supplied from the instruction section 102, estimates a skew angle $\theta$ (see FIG. 4) based on the image data supplied from the document detection section 101, which skew angle $\theta$ is an angle formed between an edge of the document placed on the scanner platen 113 and the main scanning direction. The skew angle detection section 103 causes the skew angle $\theta$ thus estimated to be stored in the storage section 200.

The skew angle correction section 104 is a block which, in response to the skew angle correction instruction supplied from the instruction 102, reads out the image data and the skew angle $\theta$ from the storage section 200, and then carries out skew angle correction with respect to the image data based on the skew angle $\theta$ read out. The image data that has been subjected to the skew angle correction in the skew angle correction section 104 is subjected to predetermined image processing, and is then supplied to a printer, a display device, and the like. The image data supplied to the printer is used in a printing process, and the image data supplied to the display device is used in a displaying process. The image data that has been subjected to the skew angle correction may be converted into a file of a predetermined format (e.g. JPEG file), and may be then stored in the storage section 200.

(Document Detection Section 101)

The following description deals with processing carried out by the document detection section 101 in more detail. The document detection section 101 estimates, based on the image data created by the image reading apparatus 150, coordinate values P1 (X1, Y1), P2 (X2, Y2), P3 (X3, Y3), and P4 (X4, Y4) of respective vertexes (corners) of a document. That is, positions of the respective vertexes of the document having a rectangular shape are specified. Note that a straight line connecting P1 and P2 and a straight line connecting P3 and P4 correspond to a lateral direction of the document, and a straight line connecting P1 and P3 and a straight line connecting P2 and P4 correspond to a longitudinal direction of the document.

In a case where an entire area of the document is completely encompassed by the read area 111, the coordinate values P1 through P4 can be specified based on the image data read from the read area 111. Further, even in a case where a document placed on the scanner platen 113 is skewed so as not to be completely encompassed by the read area 111, the coordinate values P3 and P4 of the respective vertexes located outside the read area 111 can be estimated based on the image data. This will be described below.

First, the document detection section 101 selects noted pixels for each line in the sub-scanning direction in the image data obtained by the image reading apparatus 150. Note that a pixel value of a noted pixel and pixel values of adjacent pixels are larger than a predetermined threshold value (e.g. 40). Out of the noted pixels thus selected, a leftmost pixel and a rightmost pixel are specified as edge pixels.

In a case where the number of pixels which form the respective vertexes (corners) of the document image out of all of the edge pixels in the image data is just four, it is determined that all of the vertexes of the document is located within the read area 111. Therefore, in a case where the number of pixels which form the respective vertexes of the document image is just four, the document detection section 101 sets coordinate values corresponding to the respective four vertexes of the document image as the coordinate values P1 through P4 of the respective vertexes of the document, respectively.

Figures 4, 5:
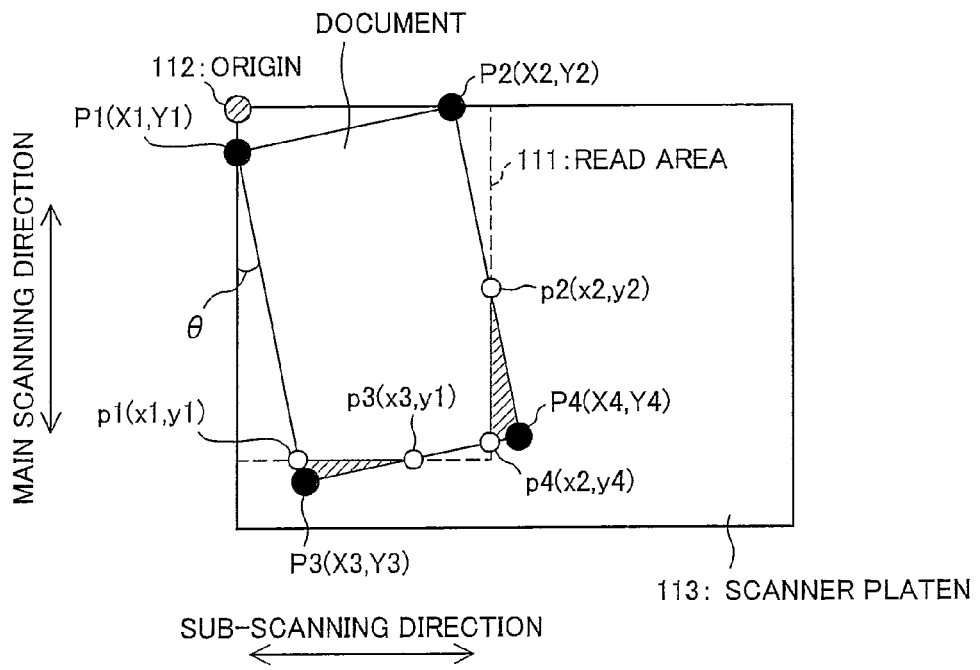
FIG. 4 is a view showing coordinate values of respective vertexes of the document placed on the scanner platen.
FIG. 5 is a table showing a relationship between (i) the number of pixels in a longitudinal direction and the number of pixels in a lateral direction of a document image and (ii) a sheet size (document size).

Meanwhile, in a case where the number of pixels which form the respective vertexes (corners) of the document image out of all of the edge pixels in the image data is more than four as illustrated in FIG. 4, the document detection section 101 carries out the following processing. First, the document detection section 101 sets the uppermost pixel, the lowermost pixel, the leftmost pixel, and the rightmost pixel out of all the edge pixels in the image data as a top pixel, a bottom pixel, a left pixel, and a right pixel, respectively. Then, the document detection section 101 finds coordinate values of the top pixel, the bottom pixel, the left pixel, and the right pixel. In an example shown in FIG. 4, the top pixel, the bottom pixel, the left pixel, and the right pixel have the following coordinate values, respectively.

Top pixel: P2 (X2, Y2)
Bottom pixel: p1 (x1, y1), p3 (x3, y1)
Left pixel: P1 (X1, Y1)
Right pixel: p2 (x2, y2), p4 (x2, y4)
Note that the following is satisfied: x3>x1, y4>y2.

Among the top pixel, the bottom pixel, the left pixel, and the right pixel, pixels (the top pixel and the left pixel), each of which has only one coordinate value, are regarded as pixels corresponding to vertexes of the document. Specifically, in the example shown in FIG. 4, the document detection section 101 regards P2 and P1 as coordinate values of the vertexes of the document.

In contrast to this, among the top pixel, the bottom pixel, the left pixel, and the right pixel, pixels (the bottom pixel and the right pixel), each of which has two coordinate values, are not regarded as pixels corresponding to vertexes of the document. Specifically, in the example shown in FIG. 4, the document detection section 101 does not regard p1 (x1, y1), p3 (x3, y1), p2 (x2, y2), and p4 (x2, y4) as coordinate values of the vertexes of the document. The document detection section 101 estimates coordinate values of the respective vertexes of the document other than P1 and P2 based on the coordinate values of the respective pixels and lines connecting the pixels. In the example shown in FIG. 4, the document detection section 101 finds a straight line connecting P1 and p1, a straight line connecting P2 and p2, and a straight line connecting p3 and p4. Then, the document detection section 101 finds a coordinate value P3 (X3, Y3) of an intersection of the straight line connecting P1 and p1 and the straight line connecting p3 and p4. Further, the document detection section 101 finds a coordinate value P4 (X4, Y4) of an intersection of the straight line connecting P2 and p2 and the straight line connecting p3 and p4. The document detection section 101 sets P3 and P4 thus found as coordinate values of vertexes of the document which vertexes are located outside the read area 111. In this manner, the document detection section 101 can find the coordinate values P1 (X1, Y1), P2 (X2, Y2), P3 (X3, Y3), and P4 (X4, Y4) of the respective vertexes (corners) of the document even if at least one of the vertexes of the document is located outside the read area 111.

The document detection section 101 transmits, as document area information, the coordinate values P1 through P4 to the instruction section 102. Since a document has a rectangular shape, an entire area of the document can be specified as long as coordinate values of respective vertexes of the document can be specified. On this account, in the present embodiment, the coordinate values P1 through P4 are used as document area information.

That is, in a case where a document image shown in image data created by the image reading apparatus 150 has just four corners, the document detection section 101 regards coordinates of the respective corners of the document image as coordinates of respective vertexes of the document, and outputs, as document area information, coordinate values of the respective corners of the document image. Meanwhile, in a case where a document image shown in the image data has more than four corners, the document detection section 101 specifies, based on the image data, coordinate values (P1 and P2 in FIG. 4) of vertexes located within the read area 111 among the vertexes of the document placed on the scanner platen 113. Subsequently, the document detection section 101 specifies coordinate values (p1 through p4 in FIG. 4) of intersections between (i) a boundary line between the read area 111 and an area other than the read area 111 and (ii) sides of the document placed on the scanner platen 113. Then, the document detection section 101 estimates, based on the coordinate values of the vertexes and the intersections thus specified, coordinate values (P3 and P4 in FIG. 4) of vertexes located outside the read area 111 among the vertexes of the document placed on the scanner platen 113. Then, the document detection section 101 outputs, as document area information, the coordinate values of the respective vertexes located within the read area 111 and the coordinate values of the respective vertexes thus estimated.

It is also possible that coordinate values of respective vertexes located outside the read area 111 among the vertexes of the document are specified with reference to a table which shows a relationship between (i) the number of pixels in a longitudinal direction (longer side direction) of the document image and the number of pixels in a lateral direction (shorter side direction) of the document image and (ii) a sheet size (document size) (see FIG. 5). For example, in a case where the document is placed as shown in FIG. 4, the coordinate values P3 and P4 of the vertexes located outside the read area 111 can be specified as long as the coordinate values P1 and P2 of the vertexes located within the read area 111 can be specified. Specifically, the number of pixels between P1 and P2 is found based on the coordinate values of P1 and P2, and then a sheet size whose number of pixels in a longitudinal direction or whose number of pixels in a lateral direction is closest to the number of pixels thus found is specified with reference to the table shown in FIG. 5. The coordinate values P3 and P4 can be found based on the number of pixels in the longitudinal direction and the number of pixels in the lateral direction which are associated with the sheet size thus specified, the straight line connecting P1 and p1, and the straight line connecting P2 and p2.

(Instruction Section 102)

The following description deals with processing carried out by the instruction section 102 in more detail. As illustrated in FIG. 6(b), the instruction section 102 includes a determining section 121, a setting section 122, a rereading instruction section 123, and a correction instruction section 124.

The determining section 121 determines how a document is placed on the scanner platen 113, based on the document area information supplied from the document detection section 101. More specifically, the determining section 121 carries out a first determining process of determining whether or not the read area 111 completely encompasses the document. In a case where it is determined, in the first determining process, that the document is not completely encompassed by the read area 111, the determining section 121 carries out a second determining process of determining whether or not the scanner platen 113 completely encompasses the document. These determining processes are described below.

First, the first determining process is described. In a case where the determining section 121 receives, as document area information, the coordinate values P1 through P4 of the respective vertexes of the document, the determining section 121 compares the coordinate values P1 through P4 with the read area 111 so as to determine whether or not the read area 111 completely encompasses the document. Specifically, an upper left vertex of the read area 111 is set as an origin (0, 0), and a lower right vertex of the read area 111 is set to have a coordinate value R (X5, Y5). Then, the determining section 121 determines whether or not each of the coordinate values P1 through P4 satisfies the following condition 1.

Condition 1: An X-coordinate value falls in a range from not less than 0 to not more than X5, and a Y-coordinate value falls in a range from not less than 0 to not more than Y5.

Here, coordinates having coordinates values (e.g. P1 through P4 in FIG. 7(a)) which satisfy the condition 1 are located within the read area 111. In contrast, coordinates having coordinate values (e.g. P3 in FIG. 7(b) and P1 in FIG. 7(c)) which do not satisfy the condition 1 are located outside the read area 111.

In view of this, the determining section 121 determines that an entire area of the document placed on the scanner platen 113 is completely encompassed by the read area 111 (hereinafter referred to as "state 1") in a case where all of the coordinate values P1 through P4 supplied from the document detection section 101 satisfies the condition 1. Note that FIG. 7(a) shows the state 1. In contrast, in a case where at least one of the coordinate values P1 through P4 does not satisfy the condition 1, the determining section 121 determines that the document placed on the scanner platen 113 is not completely encompassed by the read area 111 (hereinafter referred to as "state 2"). Note that FIGS. 7(b) and 7(c) respectively show a state 2a and state 2b, each of which belongs to the state 2.

Next, the second determining process is described. The state 2 is classified into (i) a state where a document is not completely encompassed by the read area 111, but is completely encompassed by the scanner platen 113 (hereinafter referred to as "state 2a") and (ii) a state where a document is not completely encompassed by the read area 111 and the scanner platen 113 (hereinafter referred to as "state 2b") (see FIGS. 7(b) and 7(c)). In view of this, in a case where it is determined, in the first determining process, that a document is in the state 2, the determining section 121 carries out the second determining process of determining whether or not the scanner platen 113 completely encompasses. Specifically, a coordinate value of a lower right vertex of the scanner platen 113 is set as Q (X6, Y6) (see FIG. 3). Then, the determining section 121 determines whether or not coordinate values, which do not satisfy the condition 1, among the coordinate values P1 through P4 supplied from the document detection section 101 satisfy the following condition 2.

Condition 2: An X-coordinate value falls in a range from not less than 0 to not more than X6, and a Y-coordinate value falls in a range from not less than 0 to not more than Y6.

Here, coordinates whose values do not satisfy the condition 1 but satisfy the condition 2 (e.g. P3 and P4 of FIG. 7(b)) are not located within the read area 111, but are located within the scanner platen 113. Coordinates whose values satisfy neither the condition 1 nor the condition 2 (e.g. P1 of FIG. 7(c)) are not located within the scanner platen 113.

Specifically, in a case where at least one of the coordinate values determined as not satisfying the condition 1 in the first determining process does not satisfy the condition 2, the determining section 121 determines that the document is in the state 2b. Meanwhile, in a case where all of the coordinate values determined as not satisfying the condition 1 in the first determining process satisfy the condition 2, the determining section 121 determines that the document is in the state 2a.

Then, the determining section 121 gives a processing command to the correction instruction section 124 in a case where it is determined, in the first determining process, that the document is in the state 1 or in a case where it is determined, in the second determining process, that the document is in the state 2b. Meanwhile, the determining section gives a processing command to the setting section 122 in a case where it is determined, in the second determining process, that the document is in the state 2a.

In response to the processing command given from the determining section 121, the setting section 122 set a reread area which encompasses an entire area of a document placed on the scanner platen 113. This is described below in more detail. The setting section 122 identifies the maximum X-coordinate value among X-coordinate values of the respective P1 through P4 of the respective vertexes of the document, and identifies the maximum Y-coordinate value among Y-coordinate values of the respective P1 through P4 of the respective vertexes of the document. Further, the setting section 122 sets, as R' (X5', Y5'), a coordinate value of a lower right vertex of a reread area 114 (see C of FIG. 10). The setting section 122 sets a value of X5' of the coordinate value R' so that the value of X5' becomes larger than the maximum X-coordinate value among the X-coordinate values of the respective P1 through P4, and sets a value of Y5' of the coordinate value R' so that the value of Y5' becomes larger than the maximum Y-coordinate value among the Y-coordinate values of the respective P1 through P4. Then, the setting section 122 sets, as the reread area 114, a rectangle having vertexes of (0, 0), (X5', Y5'), (0, Y5'), and (X5', 0) (see C of FIG. 10). The reread area 114 thus set encompasses all of the vertexes of the document, and therefore encompasses the entire area of the document (see C of FIG. 10).

The setting section 122 transmits a processing command to the reread instruction section 123 after setting the reread area 114.

In response to the processing command given from the setting section 122, the rereading instruction section 123 gives the image reading apparatus 150 a rereading instruction to read the reread area 114. In response to this, the image reading apparatus 150 reads the reread area 114 (i.e., rescans the document).

In response to the processing command given from the determining section 121, the correction instruction section 124 gives a skew angle correction instruction to the skew angle detection section 103 and the skew angle correction section 104.

(Skew Angle Detection Section 103)

The following description deals with processing carried out by the skew angle detection section 103 in more detail. The skew angle detection section 103 is a block which, in response to the skew angle correction instruction given from the instruction section 102, estimates, based on the image data supplied from the document detection section 101, a skew angle θ formed by an edge of the document placed on the scanner platen 113 and the main scanning direction. Although the skew angle θ can be estimated by various conventionally known methods, the skew angle θ is estimated, in the present embodiment, by a method described in Japanese Patent Application Publication, Tokukaihei, No. 7-192086. This method is described below.

Figure 6A:
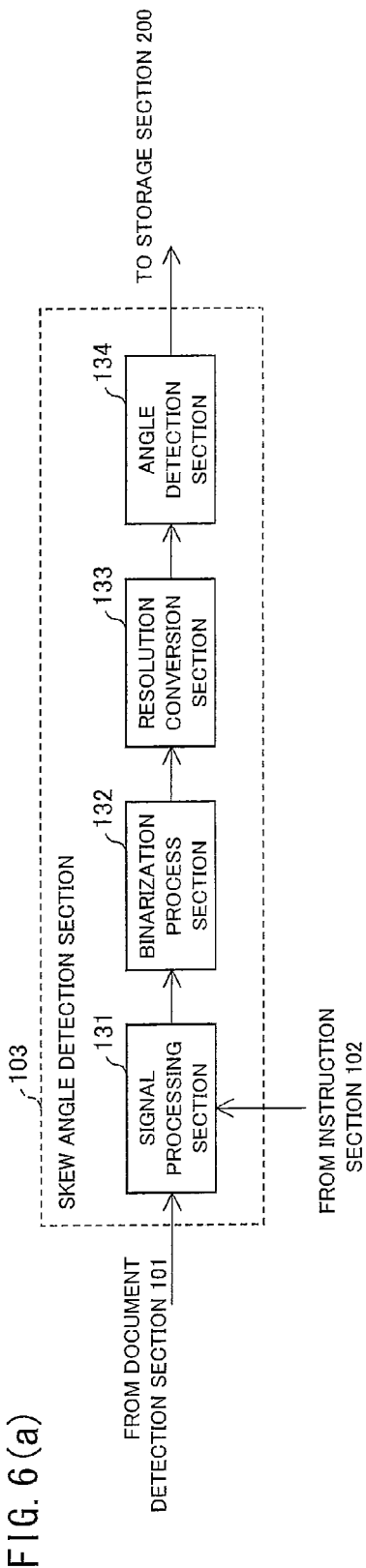
FIG. 6(a) is a block diagram illustrating an internal arrangement of a skew angle detection section illustrated in FIG. 2.
Figure 6B:
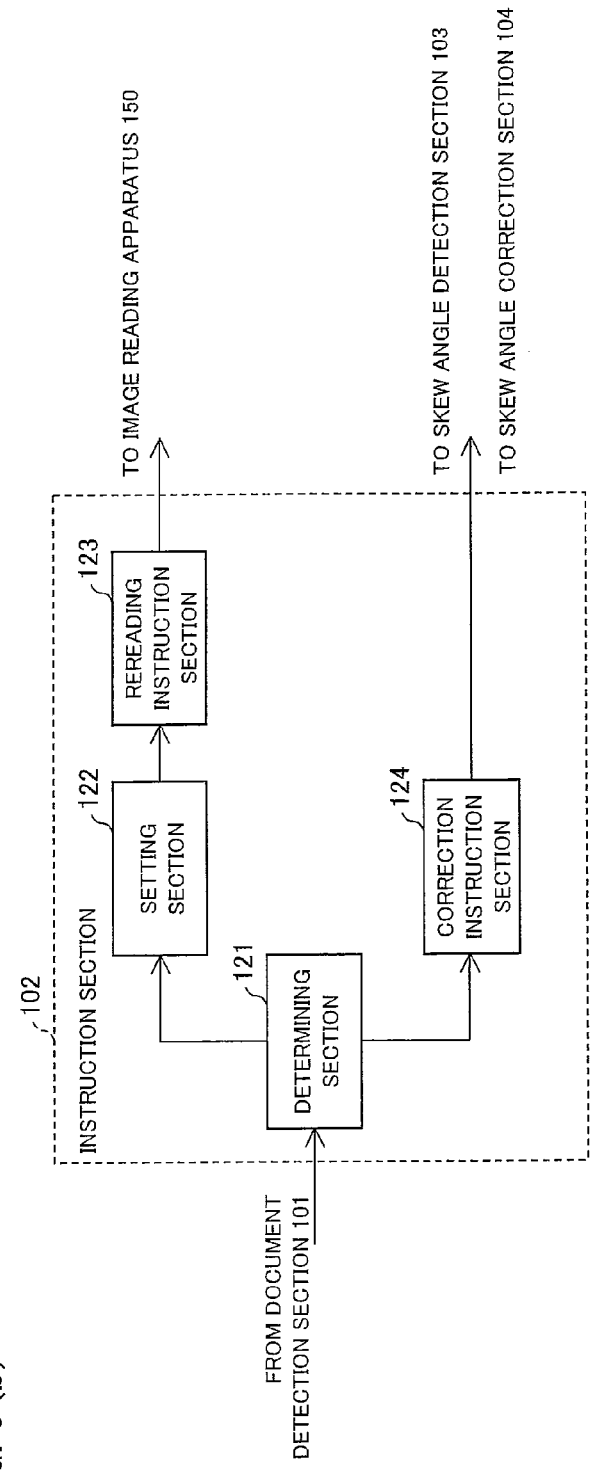
FIG. 6(b) is a block diagram illustrating an internal arrangement of an instruction section illustrated in FIG. 2.

As illustrated in FIG. 6(a), the skew angle detection section 103 includes a signal processing section 131, a binarization process section 132, a resolution conversion section 133, and an angle detection section 134.

In response to the skew angle correction instruction given from the instruction section 102, the signal processing section 131 converts RGB image data supplied from the image reading apparatus 150 into a luminance value on the basis of the following equation a, and then supplies the luminance value to the binarization process section 132.

$Yi = 0.30Ri + 0.59Gi + 0.11Bi$ equation a

Y: luminance value of pixel

R, G, B: color component value of pixel i: value given to pixel (i is an integer equal to or larger than 1)

The binarization process section 132 carries out a binarization process with respect to the luminance value supplied from the signal processing section 131 so as to create binary image data. Here, a threshold value used in the binarization process is, for example, set to 128, provided that the image data is 8-bit image data. It is also possible that (i) the image data is divided into blocks, each of which is constituted by a plurality of pixels (e.g. 5×5 pixels), and (ii) an average value of luminance values in each block is set as a threshold value for pixels in the block.

Note that the binary data may be created by binarizing L* value of L*a*b* values obtained from the RGB image data instead of creating the binary data by binarizing the luminance value obtained from the RGB image data. The L* value is a value indicative of lightness in the CIE1976L*a*b* color system (CIE: Commission Internationale de l'Eclairage), and the a* value and the b* value are values indicative of chromaticity in the CIE1976L*a*b* color system. Alternatively, the binary data may be created by binarizing a value of a G signal.

The resolution conversion section 133 reduces resolution of the binary image data created by the binarization process section 132. The resolution conversion section 133 converts data scanned at 1200 dpi or 600 dpi into data having 300 dpi, for example. The resolution conversion is carried out by a conventionally known method such as a nearest neighbor method, a bilinear method, or a bicubic method.

The angle detection section 134 (i) extracts a plurality of border points between black pixels and white pixels from the binary data that has been subjected to the resolution conversion by the resolution conversion section 133, (ii) estimates coordinates values of the respective border points (coordinate data of a point sequence), and then (iii) causes the coordinate values to be stored in the memory. For example, border points, on an upper edge of a character in the document image, between white pixels and black pixels are extracted, and coordinate values of the respective border points are found.

The angle detection section 134 finds a regression line based on the coordinate values thus found, and then finds a regression coefficient b of the regression line based on the following equation (1).

$$b = \frac{Sxy}{Sx} \quad \text{equation (1)}$$

Note that "Sx" indicates a residual sum of squares for a variable x, "Sy" indicates a residual sum of squares for a variable y, and "Sxy" indicates a sum of a product of a residual error of the variable x and a residual error of the variable y, as indicated by the following equations (2) through (4).

$$Sx = \sum_{i=1}^{n}(x_i - x)^2 = \sum_{i=1}^{n} x_i^2 - \left(\sum_{i=1}^{n} x_i\right)^2 / n \quad \text{equation (2)}$$

$$Sy = \sum_{i=1}^{n}(y_i - y)^2 = \sum_{i=1}^{n} y_i^2 - \left(\sum_{i=1}^{n} y_i\right)^2 / n \quad \text{equation (3)}$$

$$Sxy = \sum_{i=1}^{n}(x_i - x)(y_i - y) \quad \text{equation (4)}$$

$$= \sum_{i=1}^{n} x_i y_i - \left(\sum_{i=1}^{n} x_i\right)\left(\sum_{i=1}^{n} y_i\right) / n$$

The angle detection section 134 estimates θ by substituting the regression coefficient b found based on the equation (1) into the following equation (5), and set θ thus estimated as a skew angle θ. The angle detection section 134 causes the skew angle θ to be stored in the storage section 200.

$\tan θ = b$ equation (5)

The above description dealt with a case where the skew angle θ is estimated by the processing of the signal processing section 131, the binarization process section 132, the resolution conversion section 133, and the angle detection section 134. Instead, the skew angle θ may be estimated by a different method. For example, it is also possible that the skew angle θ is estimated by using the coordinate values of the top pixel, the bottom pixel, the left pixel, and the right pixel which coordinate values are found by the document detection section 101. This is described below with reference to FIG. 4. In the case of FIG. 4, a tangent of the skew angle θ can be estimated based on the coordinate values p1 and P1. Further, the tangent of the skew angle θ can also be estimated based on the coordinate values p2 and P2. That is, in the case of FIG. 4, the skew angle θ can be estimated based on the coordinate values P1 and p1, and the skew angle θ can be also estimated based on the coordinate values P2 and p2.

(Skew Angle Correction Section 104)

The following description deals with processing carried out by the skew angle correction section 104 in more detail. The skew angle correction section 104 first reads out, from the storage section 200, the skew angle θ estimated by the skew angle detection section 103 and the image data, and then carries out skew angle correction with respect to the image data on the basis of the skew angle θ. Specifically, even if an edge of a document (an edge in a longer side direction in the case of FIG. 4) is skewed with respect to the main scanning direction as illustrated in FIG. 4, the skew angle correction allows the document not to be skewed in image data to be outputted (allows a longitudinal direction of an output image to agree with a longer side direction of a document image shown in the output image).

The skew angle correction can be carried out by affine transformation using rotation matrix. The affine transformation is described below with reference to FIG. 8.

A coordinate value of a pixel (x', y') that is obtained by rotating a pixel (x, y) by an angle θ can be expressed by the following equation (6).

$$\begin{pmatrix} x' \\ y' \end{pmatrix} = \begin{pmatrix} \cos\theta & -\sin\theta \\ \sin\theta & \cos\theta \end{pmatrix}\begin{pmatrix} x \\ y \end{pmatrix} \quad \text{equation (6)}$$

$$\begin{pmatrix} xs \\ ys \end{pmatrix} = \begin{pmatrix} \cos\theta & \sin\theta \\ -\sin\theta & \cos\theta \end{pmatrix}\begin{pmatrix} x' \\ y' \end{pmatrix} \quad \text{equation (7)}$$

$$Z_{(x',y')} = Z_{(xs,ys)} \quad \text{equation (8)}$$
$$= (1-v)\{(1-u)Z_1 + uZ_2\} + v\{(i-u)Z_3 + uZ_4\}$$

A pixel value Z of the pixel (x', y') (a coordinate value of the pixel (x', y') is an integer (see FIG. 8)) is found from a pixel value Z of a pixel (xs, ys) (xs and xy are real numbers), where the pixel (xs, ys) indicates the pixel (x', y') obtained before the rotation. The pixel value Z of the pixel (xs, ys) is found by interpolation calculation such as a bilinear method.

Specifically, the pixel (xs, ys), which is obtained before the rotation, can be determined based on the equation (7) which is an inverse transformation of the equation (6). Then, the pixel value Z of the pixel (xs, ys), i.e., the pixel value Z of the pixel (x', y') can be found by substituting, into the equation (8), pixel values Z1 through Z4 of respective pixels (xi, yi), (xi+1, yi), (xi, yi+1), and (xi+1, yi+1) which pixels are located around the pixel (xs, ys) in an x-y coordinate system of an image obtained before the rotation (see FIG. 8).

Figure 8:
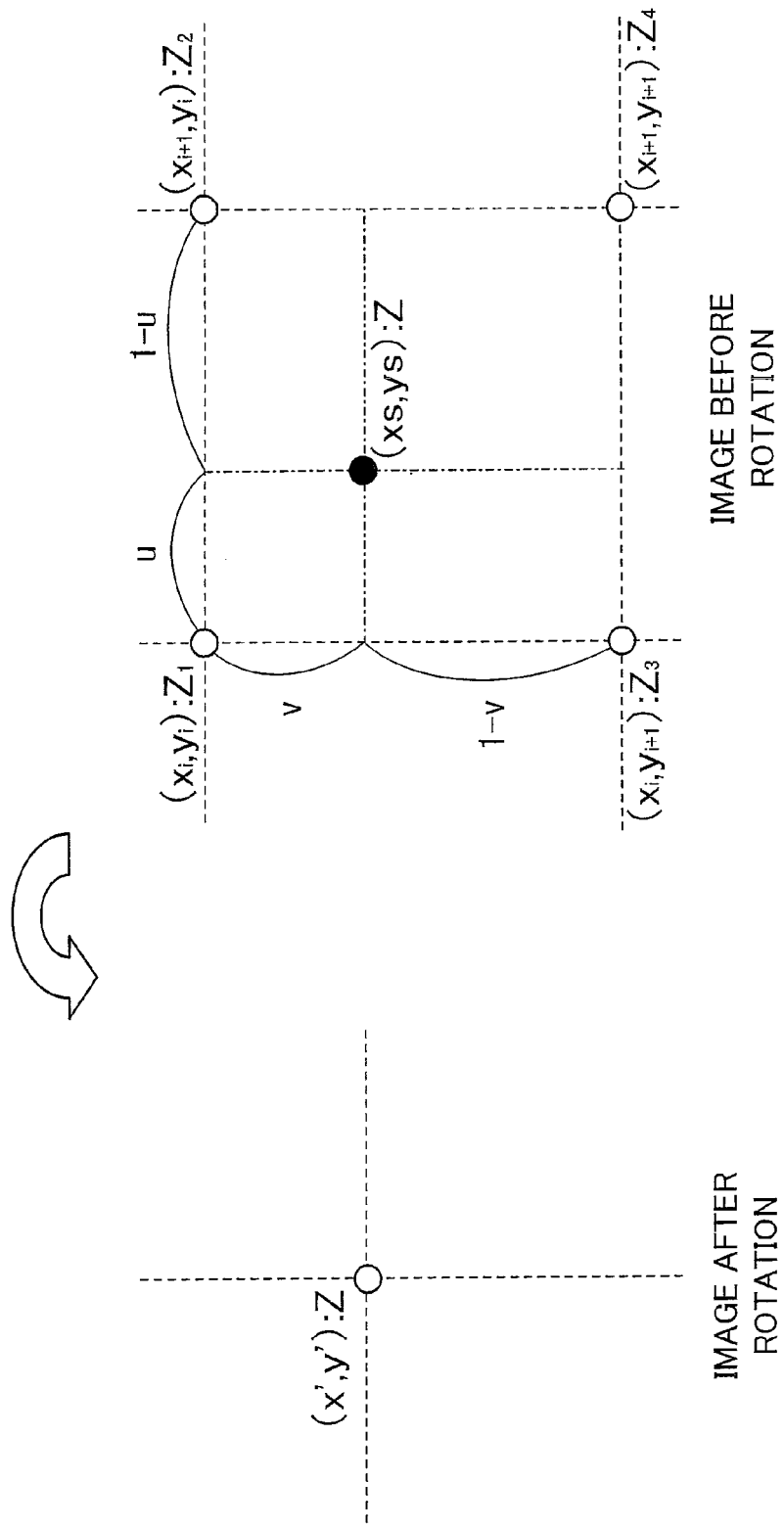
FIG. 8 is a view explaining affine conversion.

Note that, in FIG. 8 and the equation (8), xi≤xs<xi+1 and yi≤ys<yi+1 are satisfied. Note also that, in FIG. 8 and the equation (8), |xi+1−xs|:|xs−xi|=(1−u):u and |yi+1−ys|:|ys−yi|=(1−v):v are satisfied (u and v are values which fall in a range from not less than 0 to less than 1).

Execution of the affine transformation allows an image to be processed to be rotated by the angle θ, i.e., allows the skew of the image to be corrected. Specifically, in a case where an edge of a document (an edge in a longer side direction in the case of FIG. 4) is skewed, by an angle θ, with respect to the main scanning direction, the skew angle correction allows an angle formed by the main scanning direction and an edge of a document image to be zero.

(Processing Flow)

Figure 9:
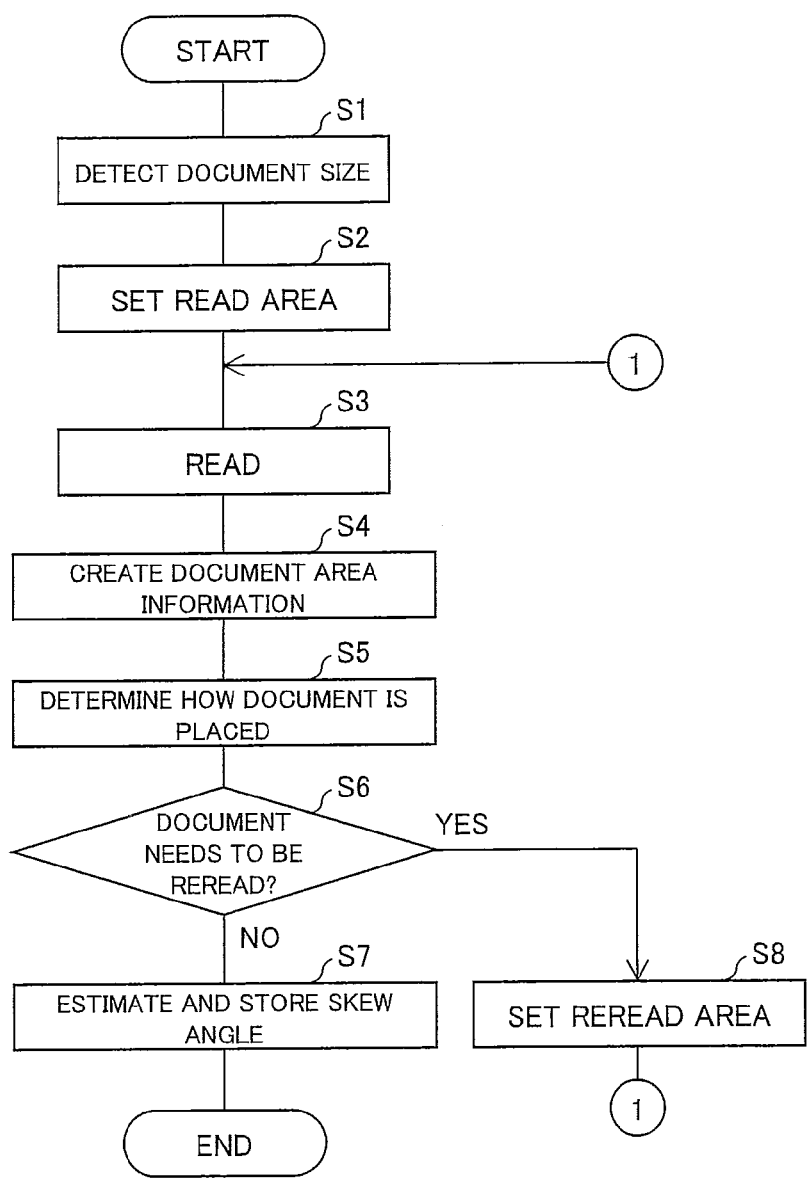
FIG. 9 is a flow chart showing a flow of processing carried out by the image processing apparatus of the embodiment of the present invention.
Figure 10:
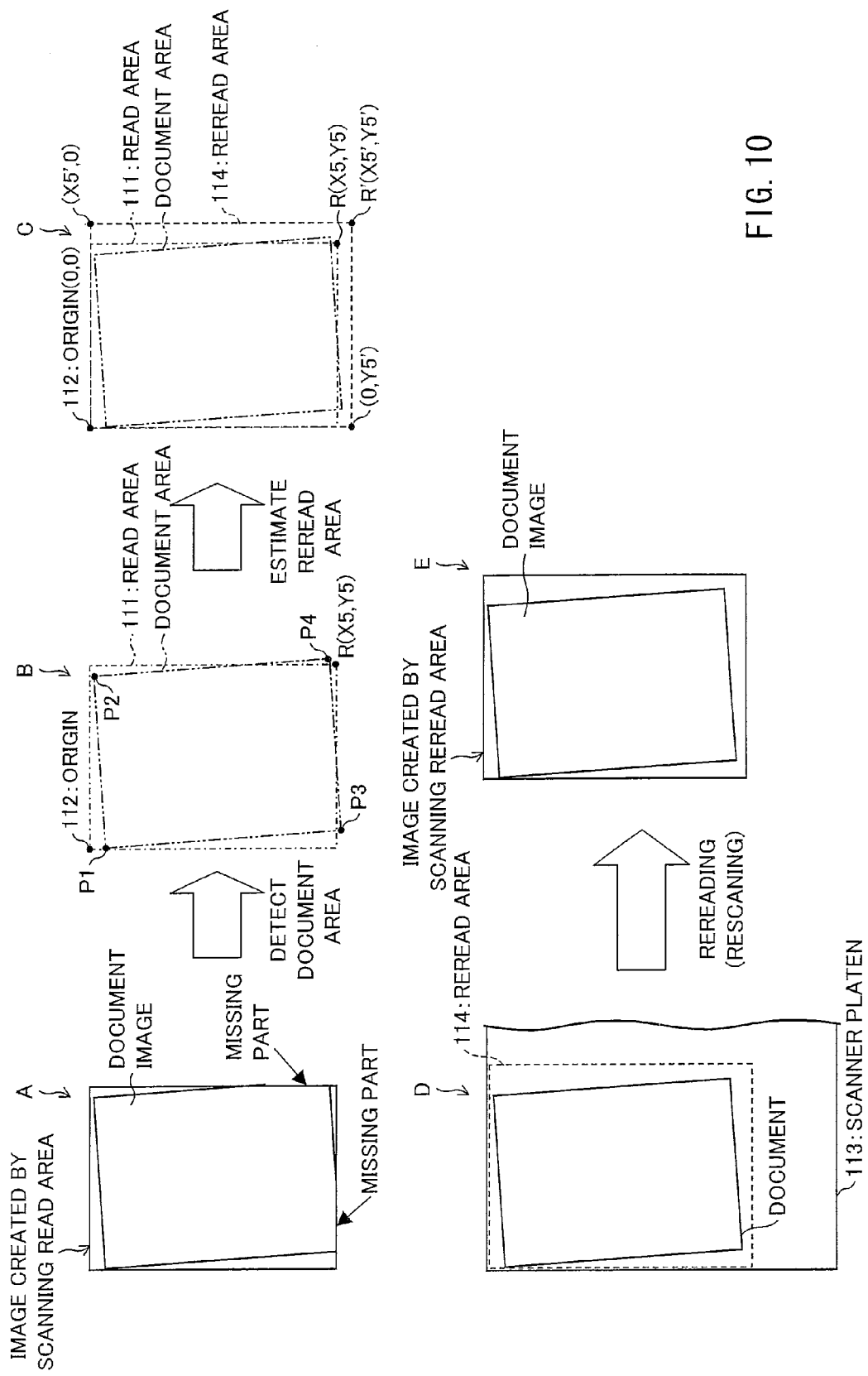
FIG. 10 is a view explaining processing carried out by the image processing apparatus of the embodiment of the present invention.

The following description deals with a flow of processing carried out by the image processing apparatus 100 with reference to FIGS. 9 and 10. FIG. 9 is a flow chart showing a flow of processing carried out by an image processing apparatus of the present embodiment, and FIG. 10 is an explanatory view explaining the processing carried out by the image processing apparatus of the present embodiment.

In a case where a user places a document on the scanner platen 113 of the image reading apparatus 150, the image processing apparatus 100 detects a document size of the document placed on the scanner platen 113 (S1) (see FIG. 9). After S1, the image processing apparatus 100 sets a read area 111 appropriate for the document placed on the scanner platen 113 in accordance with the document size thus detected (S2). After S2, the image processing apparatus 100 gives the image reading apparatus 150 an instruction to read the document. In response to this, the image reading apparatus 150 reads the read area 111 (S3) so as to create image data in which a document image is shown. Note that the image data thus created is stored in the storage section 200, and is supplied to the image processing apparatus 100.

In a case where an entire area of the document is completely encompassed by the read area 111, the entire document is shown in the image data thus created. Meanwhile, in a case where the document is not completely encompassed by the read area 111, a document image shown in the image data has missing parts (see A of FIG. 10).

Subsequently, the image processing apparatus 100 creates, based on the image data thus created, document area information indicative of an area where the document is placed on the scanner platen (S4). Note that, in the present embodiment, the image processing apparatus 100 finds, as the document area information, coordinate values P1 through P4 of respective vertexes of the document. This is because (i) the document has a rectangular shape, and therefore (ii) the area where the document is placed on the scanner platen 113 can be identified as long as the coordinate values P1 through P4 are identified.

In a case where an entire area of the document is completely encompassed by the read area 111, a document area identified by the document area information is completely encompassed by the read area 111. Meanwhile, in a case where the document is not completely encompassed by the read area 111, the document area identified by the document area information is not completely encompassed by the read area 111 (see B of FIG. 10).

Next, the image processing apparatus 100 determines, based on the document area information obtained in S4, how the document is placed (S5). More specifically, in S5, the image processing apparatus 100 determines, based on the document area information obtained in S4, whether the document is in a state 1, a state 2a, or a state 2b described below.

State 1: a state where an entire area of a document is completely encompassed by the read area 111

State 2a: a state where a document is not completely encompassed by the read area 111, but is completely encompassed by the scanner platen 113

State 2b: a state where a document is not completely encompassed by the read area 111 and the scanner platen 113

Note that FIG. 7(a) shows the state 1, FIG. 7(b) shows the state 2a, and FIG. 7(c) shows the state 2b.

In a case where it is determined, in S5, that the document is in the state 2a, the image processing apparatus 100 sets a reread area 114 in order to cause the image reading apparatus to reread the document ("YES" in S6, and S8). Note that an area which encompasses the entire area of the document is set as the reread area 114 (see C of FIG. 10).

After S8, the image processing apparatus 100 causes the image reading apparatus 150 to read the reread area 114 (S3). Reading the reread area 114 means that the entire area of the document is read (see D of FIG. 10). Therefore, a document image having no missing part is shown in an image read from the reread area 114 (see E of FIG. 10).

Note that after the reread area 114 is read in S3, the image processing apparatus carries out the processing in S4 and the subsequent steps again.

In a case where it is determined, in S5, that the document is in the state 1 or the state 2b, a skew angle θ of the document is detected and is then stored in the storage section 200 instead of rereading the document ("NO" in S6, and S7). Subsequently, the image processing apparatus 100 carries out skew angle correction with respect to the image data based on the skew angle θ if necessary, and then outputs the image data after carrying out predetermined image processing with respect to the image data.

Thus, in a case where the document is completely encompassed by the read area 111 (state 1), the image data read from the read area 111 is outputted so that an image in which a document image having no missing parts is shown can be obtained.

Meanwhile, in a case where the document is not completely encompassed by the read area 111, but is completely encompassed by the scanner platen 113 (state 2a), the reread area 114 which encompasses the entire area of the document is automatically set, and is then read. This makes it possible to create image data in which a document image having no missing part is shown, even in a case where the document is not completely encompassed by the read area 111.

However, in a case where the document is not completely encompassed by the read area 111 and the scanner platen 113, the reread area 114 is not set, and image data read from the read area 111 is outputted as it is. This is because, in a case where the document is not completely encompassed by the scanner platen 113 which is the maximum read area, image data in which a document image having no missing part is shown cannot be obtained even by reading the reread area 114. That is, the reread area 114 is not set so that an unnecessary reading operation is not carried out.

As described above, the image processing apparatus 100 of the present embodiment includes the document detection section 101 and the instruction section 102. The document detection section 101 obtains, based on the image data supplied from the image reading apparatus 150, document area information indicative of an area where the document is placed on the scanner platen 113. In a case where the area indicated by the document area information is not completely encompassed by the read area 111, the instruction section 102 set the reread area 114 which encompasses the entire area indicated by the document area information, and causes the image reading apparatus 150 to read the reread area 114.

More specifically, in the present embodiment, an area where the document is placed on the scanner platen 113 is regarded as a necessary area which needs to be read, and the document detection section 101 obtains document area information indicative of the area where the document is placed. Then, the determining section 121 of the instruction section 102 determines whether or not the area (area where the document is placed) indicated by the document area information is completely encompassed by the read area 111. In a case where it is determined that the area indicated by the document area information is not completely encompassed by the read area 111, the setting section 122 of the instruction section 102 sets a reread area which encompasses the entire area indicated by the document area information, and the image reading apparatus 150 reads the reread area.

As such, in a case where a document is not completely encompassed by the read area 111, a reread area 114, which encompasses an entire area of the document, is set based on image data read from the document, and the reread area 114 is read so that image data in which a document image having no missing part is shown is created. That is, in a case where the document is not completely encompassed by the read area 111, the document is automatically reread so that image data in which a document image having no missing part is shown can be obtained without the need for a user to manually correct location of the document. Consequently, according to the arrangement of the present embodiment, a user can carry out a rereading process more easily than a conventional art in which a user needs to manually correct location of a document.

In the present embodiment, the document detection section 101 detects, as the document area information, positions (coordinate values) of respective vertexes of a document. The determining section 121 determines whether the vertexes of the document are located outside or within the read area 111, based on the positions of the respective vertexes of the document and the location of the read area 111 which positions and location are detected by the document detection section 101. In a case where it is determined that at least one of the vertexes of the document is located outside the read area 111, the setting section 122 sets, as a reread area 114, an area which encompasses all of the vertexes of the document, based on the positions of the respective vertexes of the document which positions are detected by the document detection section 101. Thus, a reread area, which encompasses an entire area of the document, can be set in a case where the document is not completely encompassed by the read area 111. According to the arrangement, information obtained by the detection section (information indicative of positions of the respective vertexes of the document) is utilized in both of the determining process carried out by the determining section and the reread area setting process carried out by the setting section. This allows effective utilization of data and simplification of data processing.

In the present embodiment, the setting section 122 sets the reread area 114 and causes the image reading apparatus 150 to read the reread area 114 only in a case where any of the vertexes of the document is located outside the read area 111, but is not located outside the maximum read area. This makes it possible to prevent an unnecessary reading process. This is because image data in which a document image having no missing part is shown cannot be obtained even by setting the reread area 114 and causing the image reading apparatus 150 to read the reread area, in a case where the document is not completely encompassed by the scanner platen 113 which is the maximum read area.

Note that whether or not the read area 111 completely encompasses the document may be determined as follows. First, a main scanning direction histogram and a sub-scanning direction histogram of pixels (pixels whose values are not more than a threshold value (e.g., 128 in a case where image data is 8-bit image data)) of an area of the document, for example, an area of 200 lines (approximately 8 mm in a case where resolution is 600 dpi) are created based on the coordinates (p1, p3, p2, and p4 in FIG. 4) located along an edge of the document. Coordinates described below are compared with the bottom pixel and the right pixel, respectively. In a case where a difference between (i) the coordinates described below and (ii) the bottom pixel and the right pixel falls in a predetermined range (the predetermined range is, for example, set to 5% in view of differences in methods for finding coordinates), it can be determined that the document is not completely encompassed by the read area 111.

Main scanning direction histogram: endmost pixels in the main scanning direction are extracted (an uppermost pixel and a lowermost pixel are extracted in a case where the main scanning direction agrees with a vertical direction of the scanner platen 113)

Sub-scanning direction histogram: endmost pixels in the sub-scanning direction are extracted (a leftmost pixel and a rightmost pixel are extracted in a case where the sub-scanning direction agrees with a horizontal direction of the scanner platen 113)

In the present embodiment, in a case where the determining section 121 determines that a document is in the state 2b shown in FIG. 7(c), image data read from the read area 111 is outputted as it is. Instead, it is also possible that, in a case where the determining section 121 determines that a document is in the state 2b, information indicating that the document is not completely encompassed by the read area 113 is displayed on a display device (not shown) connected to the image processing apparatus 100, for example.

In S1, the image processing apparatus 100 finds a document size by causing a sensor of the image reading apparatus 150 to detect the document size. Instead, in a case where a user inputs information indicative of a document size before a reading process, the image processing apparatus 100 may find the document size based on the information inputted by the user in S1.

Embodiment 2

In a case where a document is not completely encompassed by a read area 111, but an effective image area shown in the document is completely encompassed by the read area 111, skew angle correction may be carried out with respect to image data without setting and rereading a reread area 114. The following description deals with this embodiment.

First, processing carried out by an instruction section 102 of the present embodiment is described below. As in the Embodiment 1, the instruction section 102 of the present embodiment includes a determining section 121, a setting section 122, a rereading instruction section 123, and a correction instruction section 124 (see FIG. 6(b)).

Figure 13:
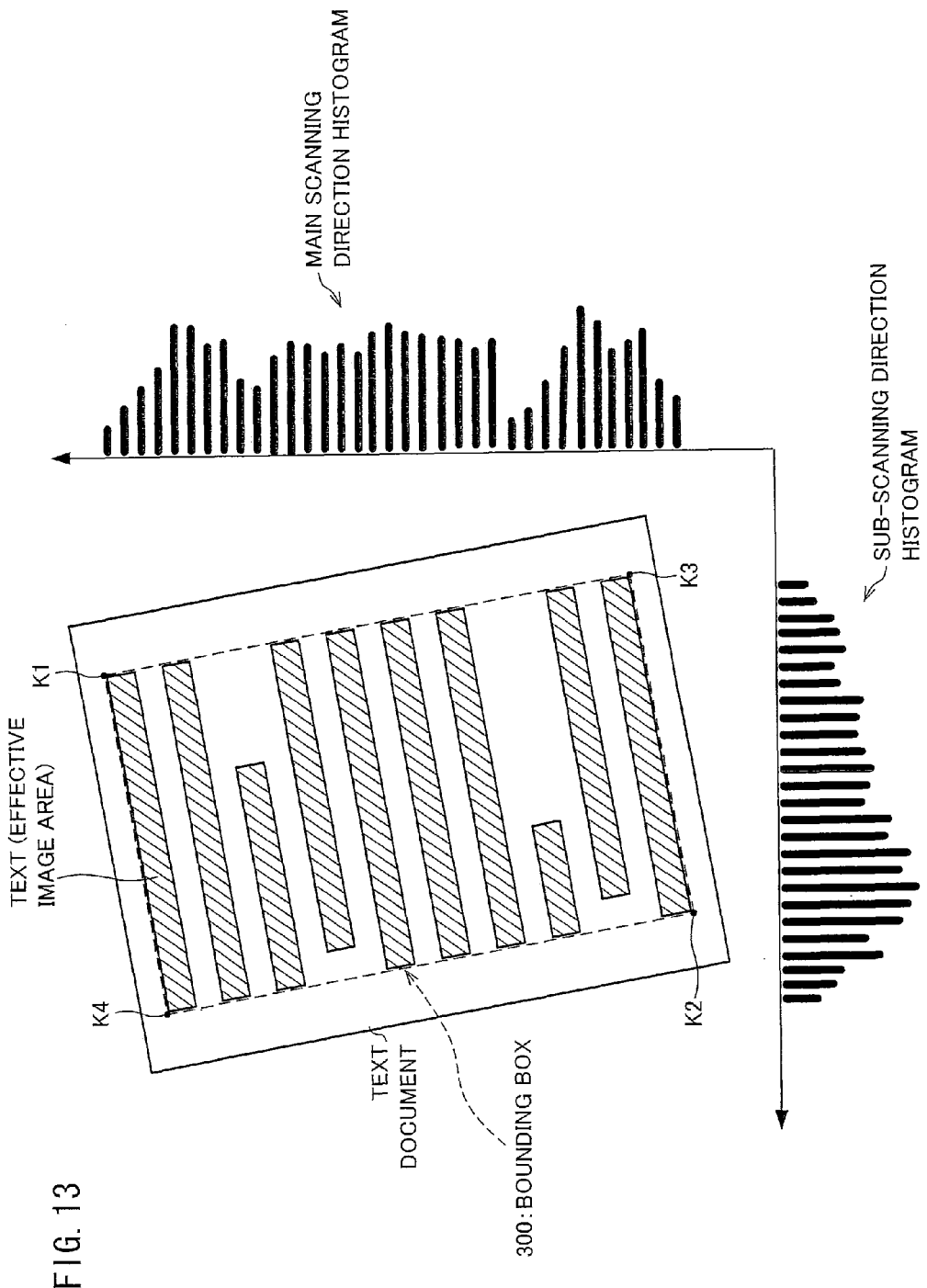
FIG. 13 is a view illustrating (i) a histogram showing frequency of black pixels in a main scanning direction and (ii) a histogram showing frequency of black pixels in a sub-scanning direction.

The determining section 121 of the present embodiment determines, based on image data created by an image reading apparatus 150, whether or not an effective image area shown in the document is completely encompassed by the read area 111. Note that the term "effective image area" refers to an area other than blank spaces and background, i.e., an area of an image such as a character, a picture, and a photograph. For example, in the case of a text document shown in FIG. 13, character images shown in the text document correspond to the effective image area. In the example of FIG. 13, the effective image area is an area indicated by diagonal lines.

The following description deals with processing carried out by the determining section 121 in detail. The determining section 121 receives image data created by the image reading apparatus 150, and carries out luminance value conversion processing, binarization processing, and resolution conversion processing in this order. The luminance value conversion processing is similar to the processing carried out by the signal processing section 131. That is, the luminance value conversion processing is processing for converting inputted image data into a luminance value. The binarization processing is similar to the processing carried out by the binarization process section 132. That is, the binarization processing is processing for binarizing the luminance value so as to create binary image data. The resolution conversion processing is similar to the processing carried out by the resolution conversion section 133. That is, the resolution conversion processing is processing for reducing resolution of the binary image data (e.g. converting the binary image data into data of 75 dpi). Note that, in a case where image data created by the image reading apparatus 150 is data of black-and-white image, binary image data is created from the image data without carrying out the luminance value conversion processing.

The determining section 121 creates, based on the binary image data whose resolution is reduced, a main scanning direction histogram and a sub-scanning direction histogram (see FIG. 13). The main scanning direction histogram shows frequency (or the number of transitions from black pixel to white pixel (or vice versa)) of black pixels in each line perpendicular to the main scanning direction, where (i) one axis is the main scanning direction, and (ii) the other axis indicates the frequency of black pixels. The sub-scanning direction histogram shows frequency of black pixels in each line perpendicular to the sub-scanning direction, where (i) one axis is the sub-scanning direction, and (ii) the other axis indicates the frequency of the black pixels.

Next, the determining section 121 identifies, based on the main scanning direction histogram, an uppermost pixel K1 and a lowermost pixel K2, and identifies, based on the sub-scanning direction histogram, a rightmost pixel K3 and a leftmost pixel K4. In the image data obtained by the image reading apparatus 150, out of pixels constituting the effective image area shown in the document, one endmost pixel in the main scanning direction is referred to as "uppermost pixel K1", the other endmost pixel in the main scanning direction is referred to as "lowermost pixel K2", one endmost pixel in the sub-scanning direction is referred to as "rightmost pixel K3", and one endmost pixel in the sub-scanning direction is referred to as "leftmost pixel K4" (see FIG. 13).

Subsequently, the determining section 121 determines whether or not the effective image areas shown in the document are completely encompassed by the read area 111. Specifically, the determining section 121 calculates the shortest distance between (i) a boundary line (a boundary line between the read area 111 and an area other than the read area 111) and (ii) each of the uppermost pixel K1, the lowermost pixel K2, the rightmost pixel K3, and the leftmost pixel K4. Note that the shortest distance can be calculated based on coordinate values of the uppermost pixel K1, the lowermost pixel K2, the rightmost pixel K3, and the leftmost pixel K4 and coordinate values of respective vertexes of the read area 111.

In a case where the shortest distance between the boundary line and each of the uppermost pixel K1, the lowermost pixel K2, the rightmost pixel K3, and the leftmost pixel K4 exceeds a threshold value (e.g. 5 mm (approximately 15 pixels in the case of 75 dpi)), the determining section 121 determines that all of the effective image areas shown in the document is completely encompassed by the read area 111. Meanwhile, in a case where the shortest distance between the boundary line and at least one of the uppermost pixel K1, the lowermost pixel K2, the rightmost pixel K3, and the leftmost pixel K4 is smaller than the threshold value, the effective image areas shown in the document may not be completely encompassed by the read area 111. Therefore, in such a case, the determining section 121 determines that the effective image areas are not completely encompassed by the read area 111.

In a case where it is determined that the effective image areas are not completely encompassed by the read area 111, the determining section 121 gives a processing command to the setting section 122. Meanwhile, in a case where it is determined that all of the effective image areas are completely encompassed by the read area 111, the determining section 121 gives a processing command to the correction instruction section 124.

In response to the processing command given by the determining section 121, the setting section 122 sets, as a reread area, an area which encompasses all of the effective image areas shown in the document. This is described below in detail.

Figure 14:
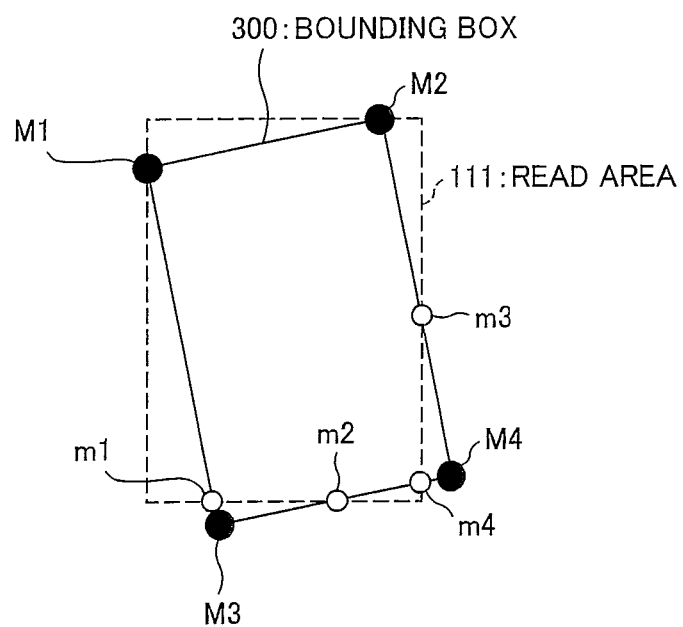
FIG. 14 is a view showing a relationship between a bounding box of an effective image area shown in a document and a read area.

A bounding box 300, which surrounds all of the effective image areas shown in the document, is set as illustrated in FIG. 13. In a case where the effective image area are not completely encompassed by the read area 111, the bounding box 300 is not completely encompassed by the read area 111 (see FIG. 14). In a case where the bounding box 300 is not completely encompassed by the read area 111, among vertexes M1 through M4 of the bounding box 300, the vertexes M1 and M2 are located within the read area 111, but the vertexes M3 and M4 are located outside the read area 111, as illustrated in FIG. 14. In this case, intersections m1, m2, m3, and m4 of (i) a boundary line between the read area 111 and the area other than the read area 111 and (ii) an edge of the bounding box 300 are formed, as illustrated in FIG. 14.

The setting section 122 estimates coordinates values of the respective vertexes M3 and M4 located outside the read area 111, based on coordinate values of the respective vertexes M1 and M2 located within the read area 111 and coordinate values of the respective intersections m1, m2, m3, and m4 formed on the boundary line. Note that the setting section 122 estimates the coordinates values of the respective vertexes M3 and M4 in a similar manner to the estimation carried out by the document detection section 101 of the Embodiment 1 (estimation of the coordinate values P3 and P4 of FIG. 4). Further, the coordinate values of the respective vertexes M1 and M2 located within the read area 111 and the coordinate values of the respective intersections m1, m2, m3, and m4 formed on the boundary line can be identified based on the positions of the endmost pixels which positions can be found based on the main scanning direction histogram and the sub-scanning direction histogram.

Then, the setting section 122 sets, based on the coordinate values of the respective vertexes M1 through M4, a reread area which encompasses all of the vertexes M1 through M4. Thus, the reread area, which completely encompasses the effective image areas shown in the document, is set. The setting section 122 gives a processing command to the rereading instruction section 123 after setting the reread area.

In response to the processing command given by the setting section 122, the rereading instruction section 123 gives the image reading apparatus 150 a rereading instruction to read the reread area, as in the Embodiment 1. In response to this, the image reading apparatus 150 reads the reread area (i.e., rescans the document). In response to the processing command given by the determining section 121, the correction instruction section 124 gives a skew angle correction instruction to the skew angle detection section 103 and to the skew angle correction section 104, as in the Embodiment 1. Note that processing carried out by the skew angle detection section 103 and the skew angle correction section 104 is similar to that of the Embodiment 1.

Figure 15:
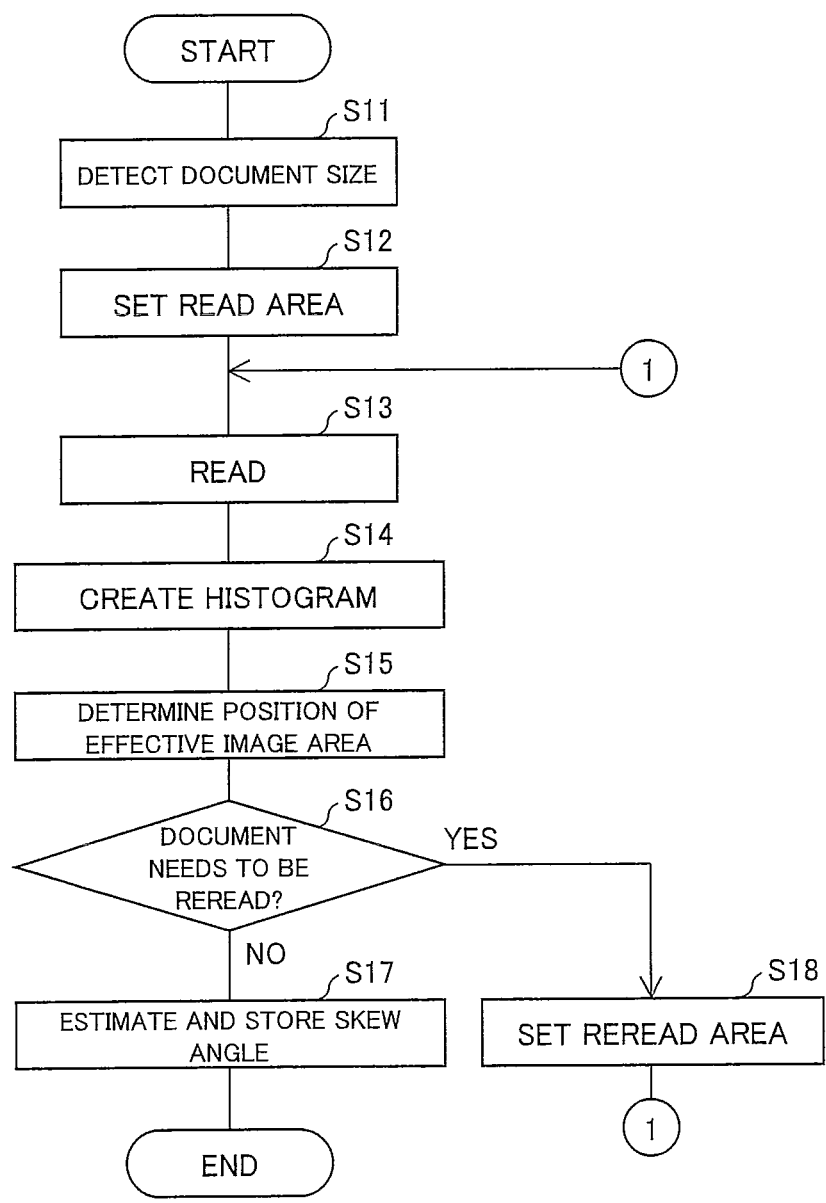
FIG. 15 is a flow chart showing a flow of processing carried out by an image processing apparatus of Embodiment 2.

The following description deals with a processing flow in the Embodiment 2 with reference to FIG. 15. FIG. 15 is a flow chart showing a flow of processing carried out by an image processing apparatus of the present embodiment. Note that S11 through S13 in FIG. 15 are identical to S1 through S3 in FIG. 9, respectively, and are therefore not explained repeatedly.

After S13, the image processing apparatus 100 creates, based on the image data created by the image reading apparatus 150, a main scanning direction histogram and a sub-scanning direction histogram (see FIG. 13) (S14). Subsequently, the image processing apparatus 100 determines positions of effective image areas based on the main scanning direction histogram and the sub-scanning direction histogram created in S14 (S15). That is, the image processing apparatus 100 determines whether or not the effective image areas shown in the document are completely encompassed by the read area 111.

In a case where it is determined, in S15, that the effective image area are not completely encompassed by the read area 111, the image processing apparatus 100 needs to cause the image reading apparatus 150 to carry out a rereading process, and therefore sets a reread area which completely encompasses the effective image areas shown in the document ("YES" in S16, and S18).

After S18, the image processing apparatus 100 causes the image reading apparatus 150 to read the reread area (S13). Reading the reread area means that all of the effective image areas shown in the document is read. Note that, after reading the reread area in S13, the image processing apparatus 100 carries out the processing in S14 and the subsequent steps again.

In a case where it is determined, in S15, that the effective image areas are not completely encompassed by the read area 111, the image processing apparatus 100 does not cause the image reading apparatus 150 to carry out a rereading process, but instead detects a skew angle θ of the document, and causes the skew angle θ thus detected to be stored in the storage section 200 ("NO" in S16, and S17).

Subsequently, the image processing apparatus 100 carries out skew angle correction with respect to the image data based on the skew angle θ, if necessary, and then outputs the image data after carrying out predetermined image processing with respect to the image data.

According to the present embodiment, the effective image areas (see FIG. 13) shown in the document are regarded as necessary areas which need to be read, and the determining section 121 determines, based on the image data obtained by the image reading apparatus 150, whether or not the effective image areas are completely encompassed by the read area 111, as described above. In a case where the determining section 121 determines that the effective image areas (necessary areas) are not completely encompassed by the read area 111, the setting section 122 sets a reread area which entirely encompasses the effective image areas, and the rereading instruction section 123 causes the image reading apparatus 150 to read the reread area thus set.

According to the arrangement, in a case where a document whose effective image areas are not completely encompassed by the read area 111 is read, a reread area, which entirely encompasses the effective image areas shown in the document, is set based on image data read from the document, and the reread area is read so that image data in which the effective image areas having no missing part is shown can be created. Therefore, in a case where a document whose effective image areas are not completely encompassed by the read area 111 is read, the document is automatically reread so that image data in which the effective image areas having no missing part is shown can be created without the need for a user to manually correct location of the document.

According to the arrangement, setting and rereading of the reread area is not carried out in a case where the document is not completely encompassed by the read area 111, but effective image areas (necessary areas) shown in the document are completely encompassed by the read area 111. This allows an improvement in efficiency of processing. That is, in a case where the document is not completely encompassed by the read area 111, but the effective image areas shown in the document are completely encompassed by the read area 111, necessary information (the effective image area) has no missing part. This makes it unnecessary to carry out a rereading process, thereby improving efficiency of processing. Note that, even if the effective image areas are read while the document is being skewed, the skew angle correction section 104 carries out skew angle correction so that the effective image areas shown in an output image are not skewed.

A method for determining whether or not the effective image areas are completely encompassed by the read area 111 is not limited to the embodiment in which the main scanning direction histogram and the sub-scanning direction histogram are used. For example, it is also possible that (i) density of black pixels of each line or average density (average pixel value of black pixels) of each block constituted by a plurality of pixels is obtained, and (ii) it is determined, based on the density or the average density, whether or not the effective image areas are completely encompassed by the read area 111.

According to the present embodiment, the determining section 121 creates the main scanning direction histogram and the sub-scanning direction histogram shown in FIG. 13, based on the image data created by the image reading apparatus 150. Both of the main scanning direction histogram and the sub-scanning direction histogram corresponds to distribution information which indicates the distribution of the effective image area shown in the image data. The determining section 121 identifies, based on the main scanning direction histogram and the sub-scanning direction histogram, one end and the other end (K1 and K2 in FIG. 13) in the main scanning direction in the effective image areas shown in the image data, and one end and the other end (K3 and K4 in FIG. 13) in the sub-scanning direction in the effective image areas shown in the image data. In a case where the shortest distance between (i) the boundary line between the read area 111 and an area other than the read area 111 and (ii) at least one of the ends thus identified is not more than a threshold value, the determining section 121 determines that the effective image areas shown in the document are not completely encompassed by the read area 111. Meanwhile, in a case where the shortest distance between (i) the boundary line and (ii) each of the ends thus identified is more than a threshold value, the determining section 121 determines that the effective image areas shown in the document are completely encompassed by the read area 111. It is therefore possible to easily and accurately determine that the effective image areas shown in the document are not completely encompassed by the read area 111.

According to the present embodiment, the setting section 122 identifies, based on the main scanning direction histogram and the sub-scanning direction histogram, (i) vertexes (M1 and M2 in FIG. 14) located within the read area 111 among the vertexes of the bounding box 300 surrounding the effective image areas shown in the document and (ii) intersections (m1, m2, m3, and m4 in FIG. 14) of the boundary line and the bounding box 300. Then, based on coordinate values of the vertexes and intersections thus identified, the setting section 122 estimates coordinate values of respective vertexes (M3 and M4) located outside the read area 111 among the vertexes of the bounding box 300. Subsequently, the setting section 122 sets, as a reread area, an area which encompasses coordinates of the respective vertexes M1 through M4 of the bounding box 300. It is therefore possible to easily and accurately set a reread area which completely encompasses the effective image areas shown in the document, in a case where the effective image areas are not completely encompassed by the read area 111.

(Application to Image Forming Apparatus)

Each section of the image processing apparatus 100 shown in FIG. 2 can be applied to an image processing apparatus (control apparatus) provided in an image forming apparatus. This is described below.

Figure 12:
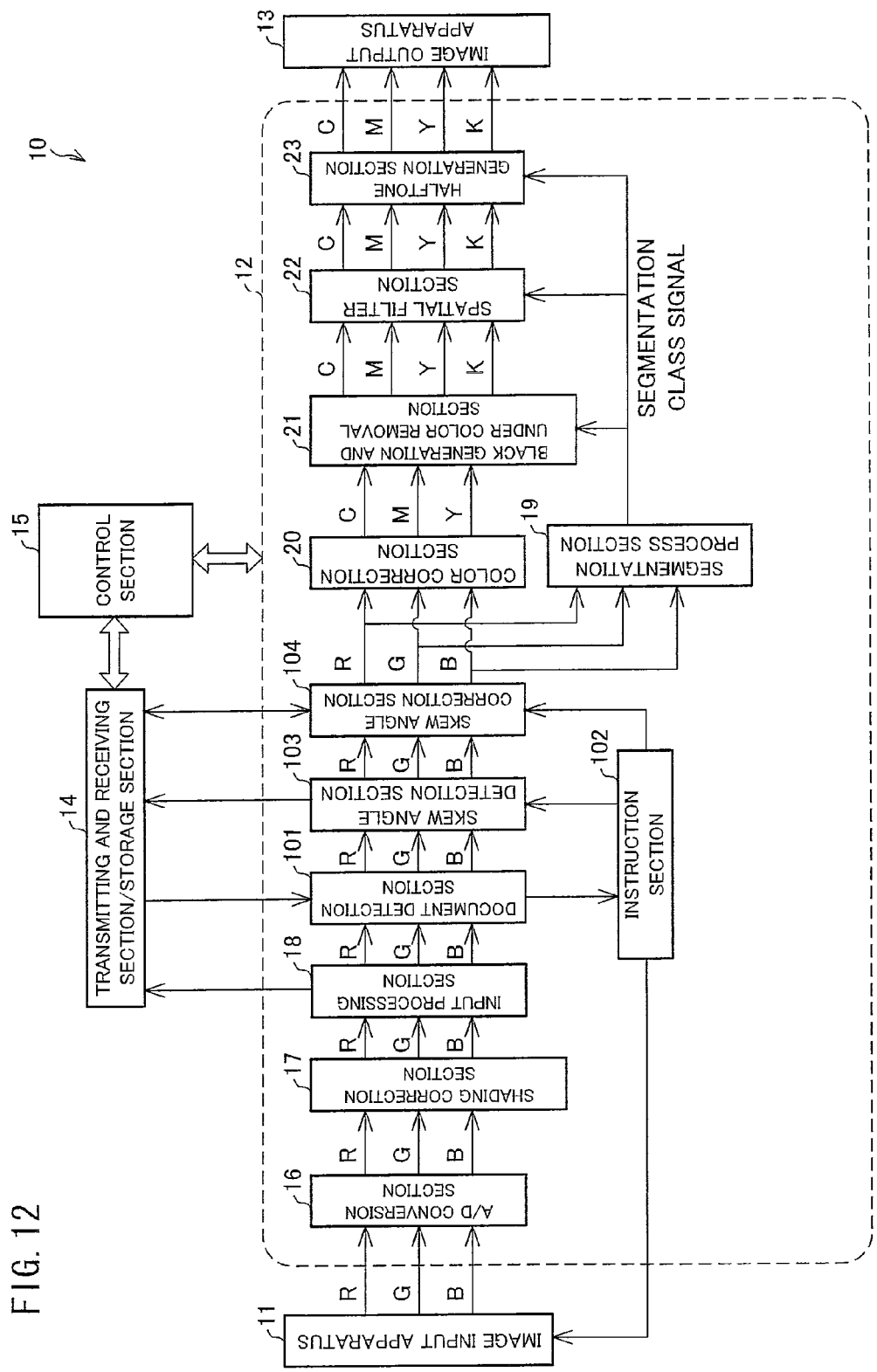
FIG. 12 is a block diagram schematically illustrating an arrangement of an image forming apparatus including the image processing apparatus of the embodiment of the present invention.

FIG. 12 is a block diagram illustrating an image forming apparatus 10 of the present embodiment. The image forming apparatus 10 is a digital color copying machine or a digital color multifunction printer. Note that the digital color multifunction printer has functions such as a copying function, a printing function, a fax sending function, and a scan to e-mail function.

The image forming apparatus 10 includes an image input apparatus (image reading apparatus) 11, an image processing apparatus 12, an image output apparatus 13, a transmitting and receiving section/ storage section 14, and a control section 15. The image processing apparatus 12 includes an A/D (analog/digital) conversion section 16, a shading correction section 17, an input processing section 18, a document detection section 101, a skew angle detection section 103, a skew angle correction section 104, an instruction section 102, a segmentation process section 19, a color correction section 20, a black generation and under color removal section 21, a spatial filter section 22, and a halftone generation section 23.

The image input apparatus 11 is constituted by a CCD (Charge Coupled Device) line sensor, and converts light reflected from a document into an RGB (R: red, G: green, B: Blue) electric signals. The A/D conversion section 16 converts the color image signals (RGB analog signals) supplied from the CCD line sensor into digital signals. The shading correction section 17 carries out a process in which various distortions, which are caused by an illumination system, an image focusing system, and/or an image sensing system of the image input apparatus 11, are removed from the digital signals. Subsequently, the input processing section 18 carries out a gamma correction process with respect to each of the RGB signals.

Data outputted from the input processing section 18 is supplied to the transmitting and receiving section/storage section 14. The document detection section 101 detects document area information based on image data stored in the transmitting and receiving section/storage section 14. It is also possible that the document detection section 101 receives image data from the input processing section 18, and detects the document area information based on the image data received.

The instruction section 102 is a block which determines how a document is placed, based on the document area information detected by the document detection section 101, and outputs a rereading instruction or a skew angle correction instruction in accordance with a result determined. Note that the rereading instruction is given to the image input apparatus 11 and the skew angle correction instruction is given to the skew angle detection section 103 and the skew angle correction section 104.

The skew angle detection section 103 is a block which estimates, in response to the skew angle correction instruction given by the instruction section 102, a skew angle $\theta$ (see FIG. 4) on the basis of the image data supplied from the document detection section 101. The skew angle detection section 103 causes the skew angle $\theta$ estimated to be stored in the transmitting and receiving section/storage section 14.

The skew angle correction section 104 is a block which, in response to the skew angle correction instruction given by the instruction section 102, reads out the image data and the skew angle θ stored in the storage section 200, and then carries out skew angle correction with respect to the image data based on the skew angle θ read out.

Each section including the color correction section 20 by which the skew angle correction section 104 is followed carries out the following image processing with respect to the image data that has been subjected to the skew angle correction of the skew angle correction section 104. Alternatively, the image data that has been subjected to the skew angle correction of the skew angle correction section 104 is converted into a PDF file format, and is then supplied to an external connection apparatus or to a communication line via a network or a communication line.

The color correction section 20 generates CMY (C: Cyan, M: Magenta, Y: Yellow) signals which are complementary colors of the RGB signals, and carries out processing of improving color reproduction. The black generation and under color removal section 21 converts the CMY signals into CMYK (K: black) signals of four colors. The spatial filter section 22 carries out an emphasizing (sharpening) process and a smoothing process with respect to the CMYK signals. The halftone generation section 23 carries out a tone reproduction process to output an image.

Meanwhile, the segmentation process section 19 determines which region (e.g. a black text, a color text, a halftone dot, or a photograph on a photographic sheet (continuous tone region)) each pixel of inputted image data belongs to. Segmentation class signal outputted from the segmentation process section 19 is supplied to the black generation and under color removal section 21, the spatial filter section 22, and the halftone generation section 23. Each of the black generation and under color removal section 21, the spatial filter section 22, and the half tone generation section 23 carries out appropriate processing in accordance with a region to which each pixel of the inputted image data belongs.

The CMYK signals outputted from the halftone generation section 23 are supplied to the image output apparatus 13 and an output image is created. Note that the image output apparatus 13 is an apparatus, which causes an image shown in image data supplied from the image processing apparatus 12 to be printed on a sheet, such as an electrophotographic printer or an ink-jet printer.

It is also possible that image data that has been subjected to the processing of the skew angle detection section 103 and if necessary, subjected to the processing of the skew angle correction section 104 is stored as filing data. In this case, the image data is compressed into a JPEG code based on a JPEG compression algorism, for example. In a case where an instruction to carry out a copy output operation or a print output operation is given, the JPEG code is read out from the transmitting and receiving section/storage section 14, is supplied to a JPEG decompressing section (not shown), and is then subjected to a decoding process so as to be converted into RGB data. Meanwhile, in a case where an instruction to carry out an image sending operation is given, the JPEG code is read out from the transmitting and receiving section/storage section 14, and then data obtained from the JPEG code is transmitted to an external communication apparatus or a communication line via a network or a communication line. Note that the control section 15 performs the tasks of managing the filing data and controlling the data transmitting operation.

(Application to Image Reading Apparatus)

Each section of the image processing apparatus 100 shown in FIG. 2 can be applied to an image processing apparatus (control apparatus) provided in an image reading apparatus. This is described below.

Figure 11:
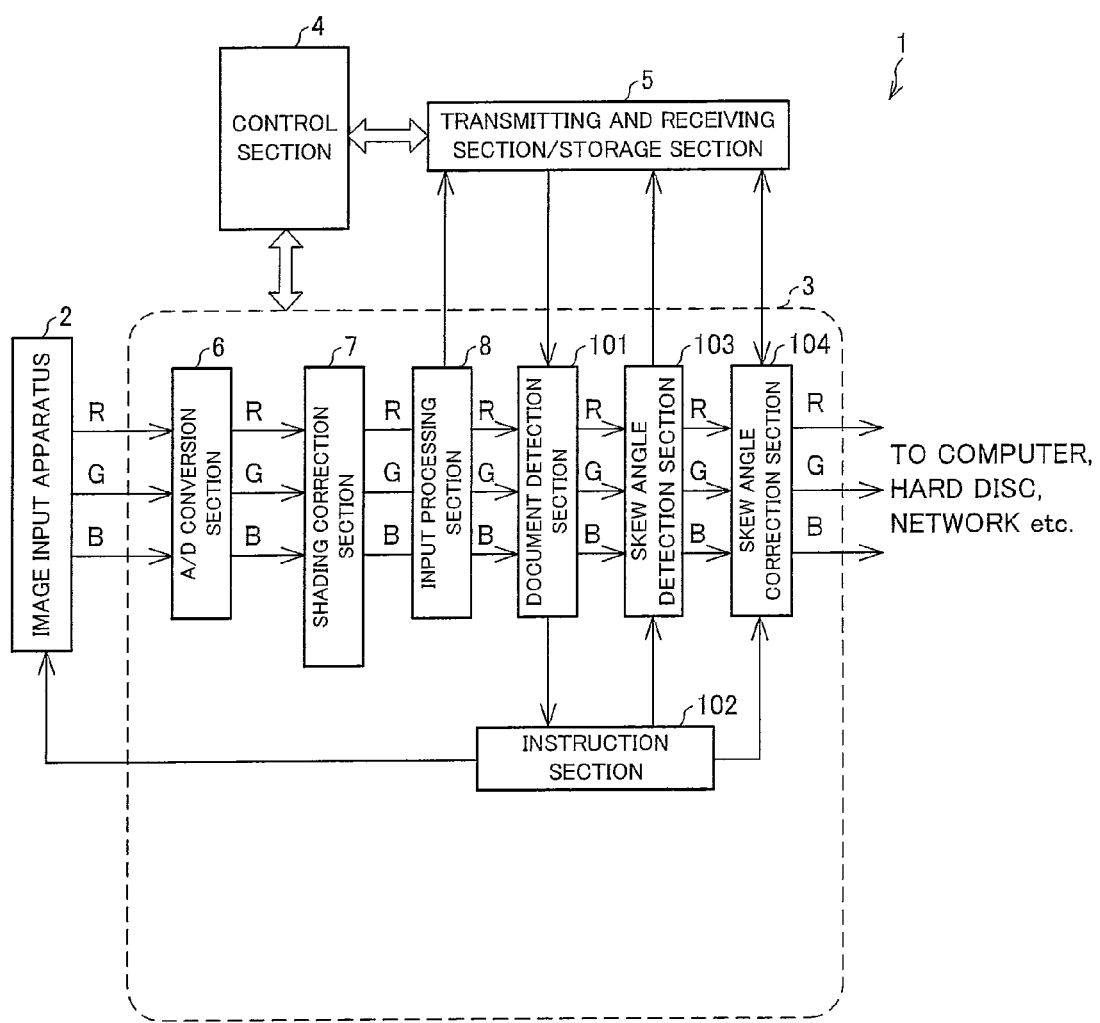
FIG. 11 is a block diagram schematically illustrating an arrangement of an image reading apparatus including the image processing apparatus of the present embodiment.

FIG. 11 is a block diagram illustrating an image reading apparatus 1 of the present embodiment. The image reading apparatus 1 is a color scanner, and is constituted by an image input apparatus 2 and an image processing apparatus 3. The image processing apparatus 3 includes an A/D conversion section 6, a shading correction section 7, an input processing section 8, a document detection section 101, a skew angle detection section 103, a skew angle correction section 104, and an instruction section 102. Note that processing carried out by each section of the image input apparatus 2 and the image processing apparatus 3 is similar to that of FIG. 12.

RGB image signals that have been subjected to the processing of each section of the image processing apparatus 3 are outputted to a computer, a hard disc, a network, or the like. Note that it is also possible that a display device is provided in the scanner itself and that an image processed by the image processing section 3 is displayed on the display device.

(Program)

Each section of the image processing apparatus 100 of the present embodiment may be realized by way of hardware or may be a computer. In this case, processing carried out by the image processing apparatus can be stored in a computer-readable storage medium containing control program code (executable program, intermediate code program, or source program) to be executed by a computer. As a result, it is possible to provide a potable storage medium in which the program is stored.

As to the storage medium of the present embodiment, a memory (not shown), for example, a ROM can become a program medium because a microcomputer executes processes. Alternatively, a program can be read out by inserting a storage medium, which is the program medium, into a program reading device provided as an external storage device (not shown).

In each case, an arrangement in which a microprocessor accesses and executes a stored program code is possible. Alternatively, another arrangement is possible in which a program code is read out and is then downloaded in a program storage area (not shown) of a microcomputer so as to be executed. Note that a program for downloading the program code is stored in a main body of the image processing apparatus in advance.

Here, the program medium is a storage medium which can be separated from a body device, and may be a medium for fixedly carrying a program code, including a tape, such as a magnetic tape or a cassette tape; a magnetic disk, such as a flexible disk or a hard disk, or an optical disk, such as CD-ROM/MO/MD/DVD; a card, such as an IC card (memory card) or an optical card; or a semiconductor memory, such as a mask ROM/EPROM/EEPROM/flash ROM.

Further, in the present embodiment, a system is arranged to be capable of being connected to a communication network including Internet. Therefore, the program medium can be a medium for fluidly bearing a program code by downloading a program code from the communication network. In a case where a program code is downloaded from a communication network, a program for downloading the program code can be stored in a main body of the image processing apparatus in advance or can be installed from a separate storage medium. The present embodiment can be realized in the form of a computer signal which is embedded into a carrier wave and is embodied by electronic transmission of the program code. The storage medium is read by a program reading device provided in a digital color image forming apparatus or in a computer system, so that the present embodiment is executed.

Overview of Embodiments

As described above, in the Embodiment 1, an image processing apparatus (control apparatus) which controls an image reading apparatus which reads a read area set in accordance with a size of a document placed on a scanner platen so as to create image data in which an image of the document is shown, the image processing apparatus includes: a document detection section which creates, based on the image data, document area information indicative of an area where the document is placed, and then outputs the document area information; and an instruction section which, in a case where the area indicated by the document area information is not completely encompassed by the read area, sets a reread area which completely encompasses the area indicated by the document area information, and causes the image reading apparatus to read the reread area. According to the arrangement, in a case where image data is read from a document which is not completely encompassed by the read area, a reread area which encompasses an entire area of the document is set based on the image data, and the reread area is read so that image data in which a document image having no missing part is shown can be created. Therefore, in a case where a document which is not completely encompassed by the read area is read, the document is automatically reread so that image data in which a document image having no missing part is shown can be created without the need for a user to manually correct location of the document. As such, the arrangement of the present invention allows a user to carry out a rereading process more easily than a conventional art which requires a user to manually correct location of a document.

According to the Embodiment 1, the document detection section detects, as the document area information, positions of respective vertexes of the document based on the image data, and the instruction section includes a determining section which determines whether the vertexes of the document are located outside or within the read area, based on the positions of the respective vertexes of the document and position of the read area; and a setting section which sets, as a reread area, an area which encompasses all of the vertexes of the document, in a case where it is determined that at least one of the vertexes of the document is located outside the read area. This makes it possible to set a reread area which encompasses an entire area of the document, in a case where the document is not completely encompassed by the read area. Further, according to the arrangement, information (information indicative of the positions of the respective vertexes of the document) detected by the document detection section is utilized in both of a determining process of the determining section and a reread area setting process of the setting section. This allows effective utilization of data and simplification of data processing.

In the Embodiment 1, in a case where a document is not completely encompassed by the maximum read area, it is impossible to set a reread area which encompasses an entire area of the document. Therefore, even if the setting section carries out arithmetic processing to set the reread area, it is impossible to set the reread area. This means that such arithmetic processing is useless. Further, even if a rereading process is carried out, it is impossible to obtain a document image having no missing part, and therefore such a rereading process is useless. In view of this, according to the image processing apparatus (control apparatus) of the Embodiment 1, the instruction section sets the reread area and causes the image reading apparatus to read the reread area only in a case where the area indicated by the document area information is not completely encompassed by the read area, but is completely encompassed by the maximum read area which is the largest read area which can be set. This eliminates the need for the useless processing.

Note that (i) an image reading apparatus including the image processing apparatus (control apparatus) of the Embodiment 1 and (ii) an image forming apparatus including the image processing apparatus and the image reading apparatus are also encompassed in the scope of the present invention. Further, in the Embodiment 1, a method for controlling an image reading apparatus which reads a read area set in accordance with a size of a document placed on a scanner platen so as to create image data in which an image of the document is shown, is arranged such that a computer (image processing apparatus) which controls the image reading apparatus carries out the steps of: outputting document area information indicative of an area where the document is placed, the document area information being created based on the image data; and setting a reread area which completely encompasses the area indicated by the document area information, and causing the image reading apparatus to read the reread area, in a case where the area indicated by the document area information is not completely encompassed by the read area.

According to the Embodiment 1, the area where the document is placed is set as a necessary area, and a reread area, which encompasses an entire area of the necessary area, is set based on the image data in a case where the determining section determines that the necessary area is not completely encompassed by the read area. However, it is also possible that effective image areas shown in the document are set as necessary areas, as in the Embodiment 2.

Each section of the image processing apparatus (control apparatus) may be realized by a computer. In this case, a control program for causing a computer to function as each section of the control apparatus and a computer-readable recording medium in which the control program is stored are also encompassed in the scope of the embodiments of the present invention.

In order to attain the above object, a control apparatus of the present invention for controlling an image reading apparatus which creates image data of a document image by reading a read area that is set on a scanner platen in accordance with a size of a document placed on the scanner platen, includes: a determining section which determines, based on the image data, whether or not the read area completely encompasses a necessary area which needs to be read on the scanner platen; a setting section which sets, based on the image data, a reread area which completely encompasses the necessary area, in a case where the determining section determines that the read area does not completely encompass the necessary area; and a rereading instruction section which causes the image reading apparatus to read the reread area that is set by the setting section. Note that the necessary area may be an area where the document is placed on the scanner platen or may be effective image areas shown in the document placed on the scanner platen.

According to the arrangement, in a case where image data is read from a necessary area which is not completely encompassed by the read area, a reread area, which encompasses an entire area of the necessary area, is set based on the image data, and then the reread area is read so that image data in which necessary information (necessary area) having no missing part is shown is created. Therefore, in a case where a document whose necessary area is not completely encompassed by the read area is read, the document is automatically reread so that image data in which a document image having no missing part is shown can be created without the need for a user to manually correct location of the document. As such, the arrangement of the present invention allows a user to carry out a rereading process more easily than a conventional art which requires a user to manually correct location of a document.

It is also possible that a document is read without detecting a document size, as described in Patent Literature 1. Specifically, the maximum area which can be read by a scanner may be set as an area to be read by the scanner. However, in this case, the maximum area is read by the scanner even in a case where the document is not skewed and is properly placed so that a corner of the document agrees with a reference position (e.g., upper left corner of the scanner platen). This causes an unnecessary area, in which the document or an effective image area of the document is not shown, to be read together with a necessary area. This requires a process of cutting the necessary part from image data. As a result, an amount of processing is increased. On the other hand, according to the present invention, a process of setting and reading a reread area is carried out in a case where the necessary area is not completely encompassed by the read area, but in a case where the necessary area is completely encompassed by a read area (an area set in accordance with a document size), the process of setting and rereading the reread area is not carried out and a process of cutting a necessary part from image data is not required. This allows for effective processing.

It is also possible that (i) four corners of a document placed on a scanner platen are found so that a bounding box is obtained, and (ii) the bounding box is set as a read area, as described in Patent Literature 2. However, This always requires a reading process to be carried out twice, i.e., (i) a first reading process in which an area where the document is placed (e.g. the maximum area which can be read by a scanner) is read so that the four corners can be found, and (ii) a second reading process in which an area where the bounding box is located is read, which area is detected based on the four corners thus found. As a result, it takes a lot of time to complete the processing. Further, since an entire area of the document is read in the first reading process, location of the document can be detected by data obtained in the first reading process. This means that the second reading process is meaningless. On the other hand, according to the present invention, a process of setting and rereading a reread area is carried out only in a case where a document whose necessary area is not completely encompassed by the read area is read. This allows for effective processing.

In a case where an area where the document is placed on the scanner platen is set as a necessary area, the image processing apparatus of the present invention is preferably arranged so as to include a document detection section which detects, based on the image data, document area information indicative of positions of respective vertexes of the document placed on the scanner platen, the determining section determining, based on the document area information, whether the vertexes of the document are located outside or within the read area, the setting section setting, as a reread area, an area which encompasses all of the vertexes indicated by the document area information. According to the arrangement, information (information indicative of positions of respective vertexes of a document) detected by the document detection section is utilized in both of a determining process of the determining section and a reread area setting process of the setting section. This allows effective utilization of data and simplification of data processing.

Further, it is preferable that in a case where the document image shown in the image data has four corners, the document detection section outputs, as the document area information, coordinate values of the respective four corners, and in a case where the document image shown in the image data has more than four corners, the document detection section (a) identifies (i) coordinate values of respective vertexes located within the read area among the vertexes of the document placed on the scanner platen, and (ii) coordinate values of respective intersections of a boundary line between the read area and an area other than the read area with sides of the document placed on the scanner platen, (b) estimates, based on the coordinate values of each of the identified vertexes and each of the identified intersections, coordinate values of respective vertexes located outside the read area among the vertexes of the document placed on the scanner platen, and (c) outputs, as the document area information, the coordinate values of the identified vertexes and the estimated vertexes. This makes it possible to easily create document area information indicative of positions of respective vertexes of a document.

Further, a reread area, which encompasses an entire area of a document, cannot be set in a case where the document is not completely encompassed by the maximum read area which is the largest area which can be read. Therefore, even if the setting section carries out arithmetic processing to set the reread area, it is impossible to set the reread area. This means that such arithmetic processing is useless. Further, even if a rereading process is carried out, it is impossible to obtain a document image having no missing part, and therefore such a rereading process is useless. In view of this, according to the image processing apparatus of the present invention, the instruction section may set the reread area and causes the image reading apparatus to read the reread area, only in a case where the area indicated by the document area information is not completely encompassed by the read area, but is completely encompassed by the maximum read area which is the largest read area which can be set. This eliminates the need for the useless processing.

Further, in a case where an effective image area shown in a document is set as a necessary area, the image processing apparatus of the present invention is preferably arranged such that the determining section (a) creates, based on the image data, distribution information indicative of distribution of the effective image area shown by the image data, (b) identifies, based on the distribution information, one end and the other end of the effective image area in a main scanning direction, and one end and the other end of the effective image area in a sub-scanning direction, (c) determines that the read area does not completely encompass the effective image area, in a case where a shortest distance between (i) a boundary line between the read area and an area other than the read area and (ii) at least one of the ends is not more than a threshold value, and (d) determines that the read area completely encompasses the effective image area, in a case where the shortest distance between (i) the boundary line and (ii) each of the ends is more than the threshold value. This makes it possible to easily and accurately determines that the effective image area is not completely encompassed by the read area.

Further, in a case where effective image areas shown in a document are set as necessary areas, the image processing apparatus of the present invention is preferably arranged such that the setting section (a) identifies, based on the distribution information, (i) vertexes located within the read area among vertexes of a bounding box of the effective image area shown in the document and (ii) intersections of the boundary line with the sides of the bounding box, (b) estimates, based on coordinate values of the vertexes and the intersections above identified, coordinate values of respective vertexes located outside the read area among the vertexes of the bounding box, and (c) sets, as the reread area, an area which encompasses all of the vertexes of the bounding box. This makes it possible to easily and accurately set a reread area, which completely encompasses the effective image area, in a case where the effective image area shown in the document is not completely encompassed by the read area.

Further, (i) an image reading apparatus including the control apparatus and (ii) an image forming apparatus including the control apparatus and the image reading apparatus are encompassed in the scope of the present invention. Further, a method of the present invention for controlling an image reading apparatus which creates image data of a document image by reading a read area that is set on a scanner platen in accordance with a size of a document placed on the scanner platen, includes: providing a computer controlling the image reading apparatus; the computer determining, based on the image data, whether or not the read area completely encompasses a necessary area which needs to be read on the scanner platen; the computer setting, based on the image data, a reread area, which completely encompasses the necessary area, in a case where it is determined that the read area does not completely encompass the necessary area; and the computer causing the image reading apparatus to read the reread area thus set.

Further, each section of the control apparatus of the present invention may be realized by a computer. In this case, (i) a control program for causing a computer to function as each section of the control apparatus and (ii) a computer-readable recording medium in which the control program is stored are also encompassed in the scope of the present invention.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention can be suitably applied to a multifunction printer, a copying machine, a scanner device, a facsimile apparatus, and a control apparatus for controlling these.

REFERENCE SIGNS LIST

1: Image reading apparatus
3: Image processing apparatus (control apparatus)
10: Image forming apparatus
11: Image input apparatus (image reading apparatus)
12: Image processing apparatus (control apparatus)
13: Image output apparatus
100: Image processing apparatus (control apparatus)
101: Document detection section
102: Instruction section
103: Skew angle detection section
104: Skew angle correction section
111: Read area
113: Scanner platen
114: Reread area
121: Determining section
122: Setting section
123: Rereading instruction section
124: Correction instruction section
150: Image reading apparatus

The invention claimed is:

1. A control apparatus for controlling an image reading apparatus which creates image data of a document by reading a read area that is set on a scanner platen in accordance with a size of the document placed on the scanner platen, the control apparatus comprising:
a determining section which determines, based on the image data, whether the document placed on the scanner platen is at least partially located outside the read area or completely located within the read area;
a setting section which sets, based on the image data, a reread area which completely encompasses the document, in a case where the determining section determines that the document is at least partially located outside the read area; and
a rereading instruction section which causes the image reading apparatus to read the reread area that is set by the setting section.

2. The control apparatus according to claim 1, further comprising a document detection section which creates, based on the image data, document area information indicative of positions of respective vertexes of the document placed on the scanner platen,
the determining section determining, based on the document area information, whether the vertexes of the document are located outside or within the read area,
the setting section setting, as the reread area, an area which encompasses all of the vertexes indicated by the document area information.

3. The control apparatus according to claim 2, wherein
in a case where the document image shown in the image data has four corners, the document detection section outputs, as the document area information, coordinate values of the respective four corners, and
in a case where the document image shown in the image data has more than four corners, the document detection section (a) identifies (i) coordinate values of respective vertexes located within the read area among the vertexes of the document placed on the scanner platen, and (ii) coordinate values of respective intersections of a boundary line between the read area and an area other than the read area with sides of the document placed on the scanner platen, (b) estimates, based on the coordinate values of each of the identified vertexes and each of the identified intersections, coordinate values of respective vertexes located outside the read area among the vertexes of the document placed on the scanner platen, and (c) outputs, as the document area information, the coordinate values of the identified vertexes and the estimated vertexes.

4. The control apparatus according to claim 1, wherein
the setting section sets the reread area only in a case where the document is at least partially located outside the read area, but the document is completely located within a maximum read area which is a largest read area among available areas.

5. A control apparatus for controlling an image reading apparatus which creates image data of a document image by reading a read area that is set on a scanner platen in accordance with a size of a document placed on the scanner platen, the control apparatus comprising:
a determining section which determines, based on the image data, whether an effective image area in the document is at least partially located outside the read area or completely located within the read area;
a setting section which sets, based on the image data, a reread area which completely encompasses the effective image area, in a case where the determining section determines that the effective image area is at least partially located outside the read area; and a rereading instruction section which causes the image reading apparatus to carry out a rereading process of reading the reread area that is set by the setting section.

6. The control apparatus according to claim 5, wherein:

the determining section (a) creates, based on the image data, distribution information indicative of distribution of the effective image area shown by the image data, (b) identifies, based on the distribution information, one end and the other end of the effective image area in a main scanning direction, and one end and the other end of the effective image area in a sub-scanning direction, (c) determines that the effective image area is at least partially located outside the read area, in a case where a shortest distance between (i) a boundary line between the read area and an area other than the read area and (ii) at least one of the ends is not more than a threshold value, and (d) determines that the effective image area is completely located within the read area, in a case where the shortest distance between (i) the boundary line and (ii) each of the ends is more than the threshold value.

7. The control apparatus according to claim 6, wherein:

the setting section (a) identifies, based on the distribution information, (i) vertexes located within the read area among vertexes of a bounding box of the effective image area shown in the document and (ii) intersections of the boundary line with the sides of the bounding box, (b) estimates, based on coordinate values of the vertexes and intersections above identified, coordinate values of respective vertexes located outside the read area among the vertexes of the bounding box, and (c) sets, as the reread area, an area which encompasses all of the vertexes of the bounding box.

8. The control apparatus according to claim 5, wherein in a case where the effective image area is completely located within the read area, the rereading instruction section outputs, even in a case where the document is at least partially located outside the read area, the image data created by reading the read area without causing the image reading apparatus to carry out the rereading process.

9. An image forming apparatus comprising:

an image reading apparatus which creates data of a document image by reading a read area that is set on a scanner platen in accordance with a size of the document placed on the scanner platen;

a control apparatus which processes the image data created by the image reading apparatus; and an image output apparatus which prints an image on a sheet on a basis of the image data having been processed by the control apparatus, the control apparatus comprising:

a determining section which determines, based on the image data, whether the document placed on the scanner platen is at least partially located outside the read area or completely located within the read area;

a setting section which sets, based on the image data, a reread area which completely encompasses the document, in a case where the determining section determines that the document is at least partially located outside the read area; and a rereading instruction section which causes the image reading apparatus to read the reread area that is set by the setting section.

10. An image forming apparatus comprising:

an image reading apparatus which creates image data of a document image by reading a read area that is set on a scanner platen in accordance with a size of a document placed on the scanner platen;

a control apparatus which processes the image data created by the image reading apparatus; and an image output apparatus which prints an image on a sheet on a basis of the image data having been processed by the control apparatus, the control apparatus comprising:

a determining section which determines, based on the image data, whether an effective image area in the document is at least partially located outside the read area or completely located within the read area;

a setting section which sets, based on the image data, a reread area which completely encompasses the effective image area, in a case where the determining section determines that the effective image area in the document is at least partially located outside the read area; and a rereading instruction section which causes the image reading apparatus to read the reread area that is set by the setting section.

* * * * *